(12) United States Patent
Cameron et al.

(10) Patent No.: US 7,886,119 B1
(45) Date of Patent: Feb. 8, 2011

(54) TIME AND SPACE EFFICIENT TECHNIQUE FOR CREATING VIRTUAL VOLUME COPIES

(75) Inventors: George R. Cameron, Sant Cruz, CA (US); Hueichian Huang, San Jose, CA (US)

(73) Assignee: 3PAR Inc., Fremont, CA (US)

( * ) Notice: Subject to any disclaimer, the term of this patent is extended or adjusted under 35 U.S.C. 154(b) by 491 days.

(21) Appl. No.: 11/679,728

(22) Filed: Feb. 27, 2007

Related U.S. Application Data

(62) Division of application No. 10/655,951, filed on Sep. 4, 2003.

(60) Provisional application No. 60/408,735, filed on Sep. 6, 2002, provisional application No. 60/409,311, filed on Sep. 6, 2002.

(51) Int. Cl.
*G06F 12/00* (2006.01)

(52) U.S. Cl. ........................ 711/162; 711/114

(58) Field of Classification Search .................. 711/162, 711/114
See application file for complete search history.

(56) References Cited

U.S. PATENT DOCUMENTS

| | | | |
|---|---|---|---|
| 5,819,292 A | 10/1998 | Hitz et al. | |
| 5,963,962 A | 10/1999 | Hitz et al. | |
| 6,061,770 A | 5/2000 | Franklin | |
| 6,289,356 B1 | 9/2001 | Hitz et al. | |
| 6,341,341 B1 | 1/2002 | Grummon et al. | |
| 6,434,681 B1 | 8/2002 | Armangau | |
| 6,604,118 B2 | 8/2003 | Kleiman et al. | |
| 6,721,764 B2 | 4/2004 | Hitz et al. | |
| 6,823,376 B1 * | 11/2004 | George et al. | 709/221 |
| 6,829,617 B2 | 12/2004 | Sawdon et al. | |
| 6,850,945 B2 | 2/2005 | Lanzatella et al. | |
| 6,892,211 B2 | 5/2005 | Hitz et al. | |
| 6,983,287 B1 | 1/2006 | Jayanti et al. | |
| 6,993,539 B2 | 1/2006 | Federwisch et al. | |
| 7,165,156 B1 | 1/2007 | Cameron et al. | |
| 2002/0083037 A1 | 6/2002 | Lewis et al. | |
| 2003/0084242 A1 | 5/2003 | Strange et al. | |

OTHER PUBLICATIONS

Dave Hitz et al., "File System Design for an NFS File Server Appliance," Technical Report 3002, Rev. C 3/95, presented Jan. 19, 1994, USENIX Winter 1994, San Francisco, California, pp. 1 to 23.

Suresh B. Siddha et al., "A Persistent Snapshot Device Driver for Linux", published Sep. 13, 2001, downloaded from http://www.linuxshowcase.org/full_papers/siddha/siddha_html/index.html on May 15, 2002. 4 pages.

Dave Hitz et al., "File System Design for an NFS File Server Appliance", paper downloaded from http://www.netapp.com/tech_library/3002.html on Sep. 30, 2002, 13 pages.

(Continued)

*Primary Examiner*—Mardochee Chery
(74) *Attorney, Agent, or Firm*—Patent Law Group LLP; David C. Hsia

(57) ABSTRACT

A chain of snapshots includes a more recent snapshot with a data block copied from a base volume, a less recent snapshot with a skip-pointer that leads to the data block in said more recent snapshot, and one or more intermediate snapshots between the more recent snapshot and the less recent snapshot in the chain of snapshots.

32 Claims, 23 Drawing Sheets

OTHER PUBLICATIONS

"Snapshot Feature", LSI Logic Storage Systems, SANtricity brochure, 2 pages.

"The Enterprise Challenge Served by Snapshot", Whitepaper, LSI Logic Storage Systems, pp. 1-8.

Suresh B. Siddha et al., "A Persistent Snapshot Device Driver for Linux", Proceedings of the 5th Annual Linux Showcase & Conference, Oakland, CA, USA, Nov. 5-10, 2001.

* cited by examiner

TIME AND SPACE EFFICIENT TECHNIQUE FOR CREATING VIRTUAL VOLUME COPIES

CROSS-REFERENCE TO RELATED APPLICATIONS

This application is a divisional of U.S. patent application Ser. No. 10/655,951, filed on Sep. 4, 2003, which claims the benefit of U.S. Provisional Application Nos. 60/408,735 and 60/409,311, both filed Sep. 6, 2002, all of which are incorporated herein by this reference.

TECHNICAL FIELD OF THE INVENTION

The present invention relates generally to data storage systems and, more particularly, to snapshots.

BACKGROUND OF THE INVENTION

Storage systems can be made up of multiple interconnected storage devices connected to one or more servers to increase performance in terms of storage capacity, reliability, scalability, and availability. System storage performance can be enhanced by using system management operations including management of data communication and management of data placement. Data system management has multiple aspects including techniques for data storage, storage device mapping, data recovery, data integrity, backup operations, and storage element utilization.

Storage systems can store large amounts of data at least partly on the basis of inherent and simple scalability. The volume capacity can be simply increased by adding physical storage devices. However, the mere addition of hardware resources does not create the most efficient and useful storage system.

Virtualization of memory facilitates the management of data storage systems. Virtualization yields a "virtual volume" which is an abstraction of the various data storage devices in the systems. According to previously developed techniques, a virtual volume of memory can be managed by maintaining a "change log" or a "dirty block list" for tracking which blocks of data on a virtual volume have changed over time. Such techniques were disadvantageous in that the change logs or dirty block lists were additional data structures that needed to be defined and maintained by the data storage systems.

SUMMARY

Disadvantages and problems associated with previously developed systems and methods for data storage have been substantially reduced or eliminated with various embodiments of the present invention.

A chain of snapshots includes a more recent snapshot with a data block copied from a base volume, a less recent snapshot with a skip-pointer that leads to the data block in said more recent snapshot, and one or more intermediate snapshots between the more recent snapshot and the less recent snapshot in the chain of snapshots.

Important technical advantages of the present invention are readily apparent to one skilled in the art from the following figures, descriptions, and claims.

BRIEF DESCRIPTION OF THE DRAWINGS

Embodiments of the invention may best be understood by referring to the following description and accompanying drawings, in which.

DETAILED DESCRIPTION

Figure 1:
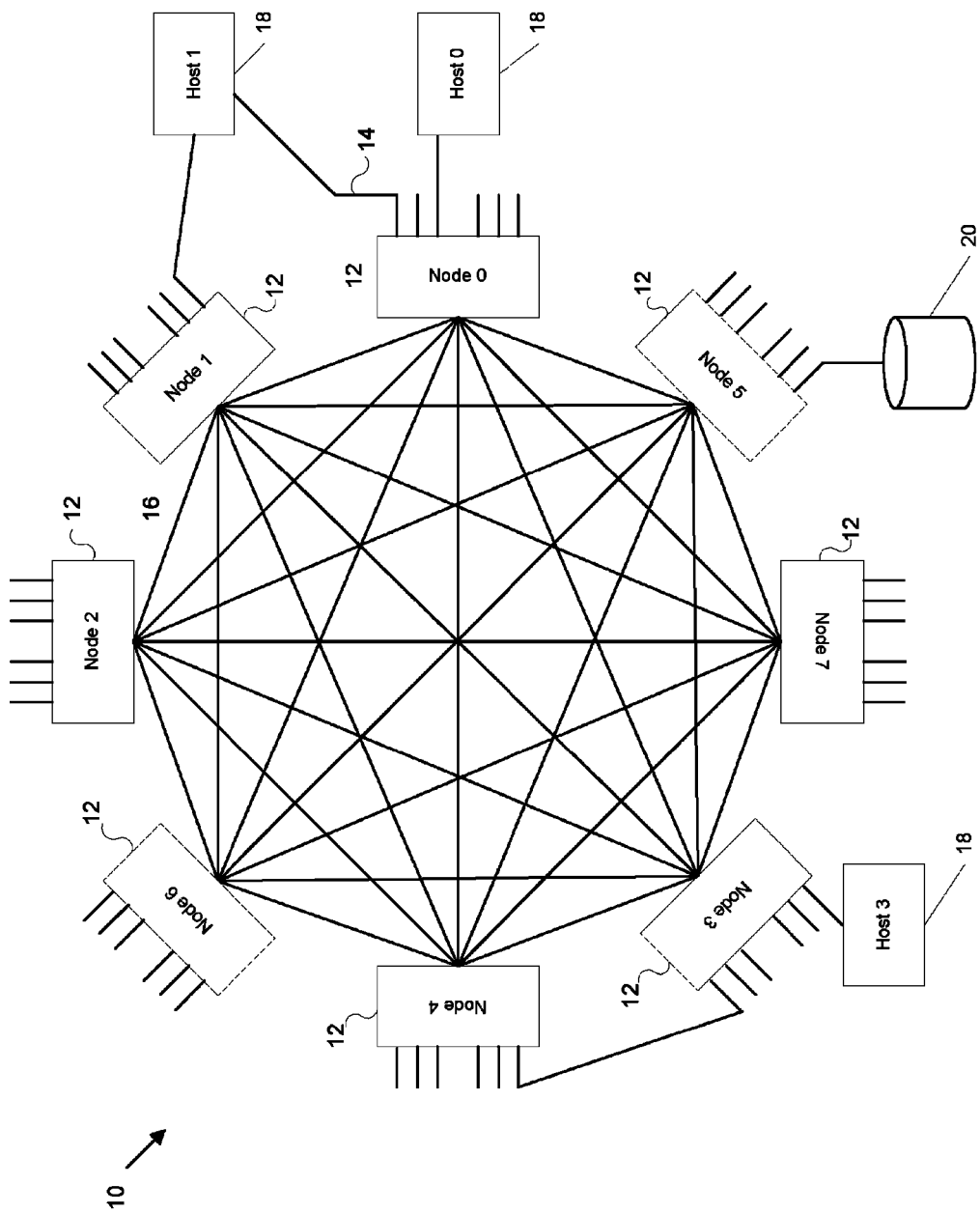
FIG. 1 illustrates a scalable cluster data handling system, which can be an exemplary environment within which embodiments of the present invention may operate.

The preferred embodiments for the present invention and their advantages are best understood by referring to FIGS.

1-10 of the drawings. Like numerals are used for like and corresponding parts of the various drawings.

Turning first to the nomenclature of the specification, the detailed description which follows is represented largely in terms of processes and symbolic representations of operations performed by conventional computer components, such as a local or remote central processing unit (CPU), processor, server, or other suitable processing device associated with a general purpose or specialized computer system, memory storage devices for the processing device, and connected local or remote pixel-oriented display devices. These operations may include the manipulation of data bits by the processing device and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer system are often referred to in terms such as adding, comparing, moving, searching, or the like, which are often associated with manual operations performed by a human operator. It must be understood that no involvement of the human operator may be necessary, or even desirable, in the present invention. Some of the operations described herein are machine operations performed in conjunction with the human operator or user that interacts with the computer or system.

In addition, it should be understood that the programs, processes, methods, and the like, described herein are but an exemplary implementation of the present invention and are not related, or limited, to any particular computer, system, apparatus, or computer language. Rather, various types of general purpose computing machines or devices may be used with programs constructed in accordance with the teachings described herein. Similarly, it may prove advantageous to construct a specialized apparatus to perform one or more of the method steps described herein by way of dedicated computer systems with hard-wired logic or programs stored in non-volatile memory, such as read-only memory (ROM).

Overview

In accordance with embodiments of the present invention, systems and methods are provided for creating a snapshot tree structure. The data and information for the snapshots may be captured or reflected in one or more exception tables. Using these exception tables, the methods and systems quickly and efficiently determine which blocks of data on the memory volume have changed over time. In some embodiments, the systems and methods determine differences between two snapshot volumes in the snapshot tree, which identifies modified pages of data. The methods and systems advantageously support or facilitate rapid synchronization of various backup copies for the memory volume.

Exemplary Environment

FIG. 1 illustrates a scalable cluster data handling system 10, which can be an exemplary environment within which embodiments of the present invention may operate. The scalable cluster data handling system 10 is an architecture suitable for communication-intensive, highly available data storage, processing, and/or routing. The architecture is useful for many applications to provide high performance, scalable, flexible, and cost-effective storage arrays.

Scalable cluster data handling system 10 can be incorporated or used in a data storage system to provide mass storage for data and information routed, generated, manipulated, processed, or otherwise operated upon, by various host devices 18. These host devices 18 can include various processing devices, such as, for example, server clusters, personal computers, mainframes, and server towers. Host devices 18 may also include various peripheral devices, such as, for example, printers, modems, and routers. Each of these host devices 18 is connected to scalable cluster data handling system 10. As used herein, the terms "connected" or "coupled" mean any connection or coupling, either direct or indirect, between two or more elements; such connection or coupling can be physical or logical. The data storage system (in which scalable cluster data handling system 10 may be incorporated) also includes a number of storage devices 20. These storage devices 20 can be implemented with any suitable mass storage resource, such as tape or disk storage. In one embodiment, the storage devices 20 may be one or more JBOD (Just a Bunch of Disks) facilities comprising a plurality of disk drives. The disk drives can be mounted in a rack-mountable storage shelf having one or more hot-pluggable disk drive sleds. Each sled may accommodate four disk drives on a pair of fibre channel (FC) connections. The sleds can be configured in one of two possible ways: (1) all sleds on the same redundant FC connections, or (2) half of the sleds on one set of redundant FC connections and the other half of the sleds on another set of redundant FC connections. Scalable cluster data handling system 10 allows the host devices 18 to store and retrieve information from the storage devices 20.

As depicted, the scalable cluster data handling system 10 includes a plurality of interconnected nodes 12. In the illustrative example, eight nodes 12 are provided, with each node 12 connected to every other node 12 by a respective high-speed link 16. Each node 12 generally functions as a point of interface/access for one or more host devices 18 and storage devices 20. In an illustrative example of the scalable cluster data handling system 10, a node 12 can be a modular computer component that has one or more PCI bus slots or other interfaces for connections to storage devices 20 and host devices 18. For this purpose, in one embodiment, each node 12 may include one or more peripheral component interconnect (PCI) slots, each of which supports a respective connection 14. Each connection 14 can connect a host device 18 or a storage device 20. Connections can be small computer system interface (SCSI), fibre channel (FC), fibre channel arbitrated loop (FCAL), Ethernet, Infiniband, or any other suitable connection. A node 12 performs software processes (procedures, methods, and routines) under control of independently executing operating systems.

In the illustrative example of FIG. 1, a host device 18 (i.e., Host 1) is in communication with a plurality of nodes 12 (i.e., Node 0 and Node 1). These nodes 12 control access to a plurality of storage devices 20 (e.g., physical disks) that are separated into multiple storage regions. A virtual volume mapping or table (described herein) at each node 12 comprises pointers that are configured to designate the location of data on the storage devices 20. The host device 18 accesses all of the storage devices of the region table in the manner of accessing a single large, fast, and reliable virtual disk with multiple redundant paths. Host device 18 can write to a particular storage region on the storage devices via one communication path and read back data on a different path. The virtual volume region table is used to track the stored data so that the most recent and correct data copy can be accessed by the host device 18 from a proper node 12.

Figure 2:
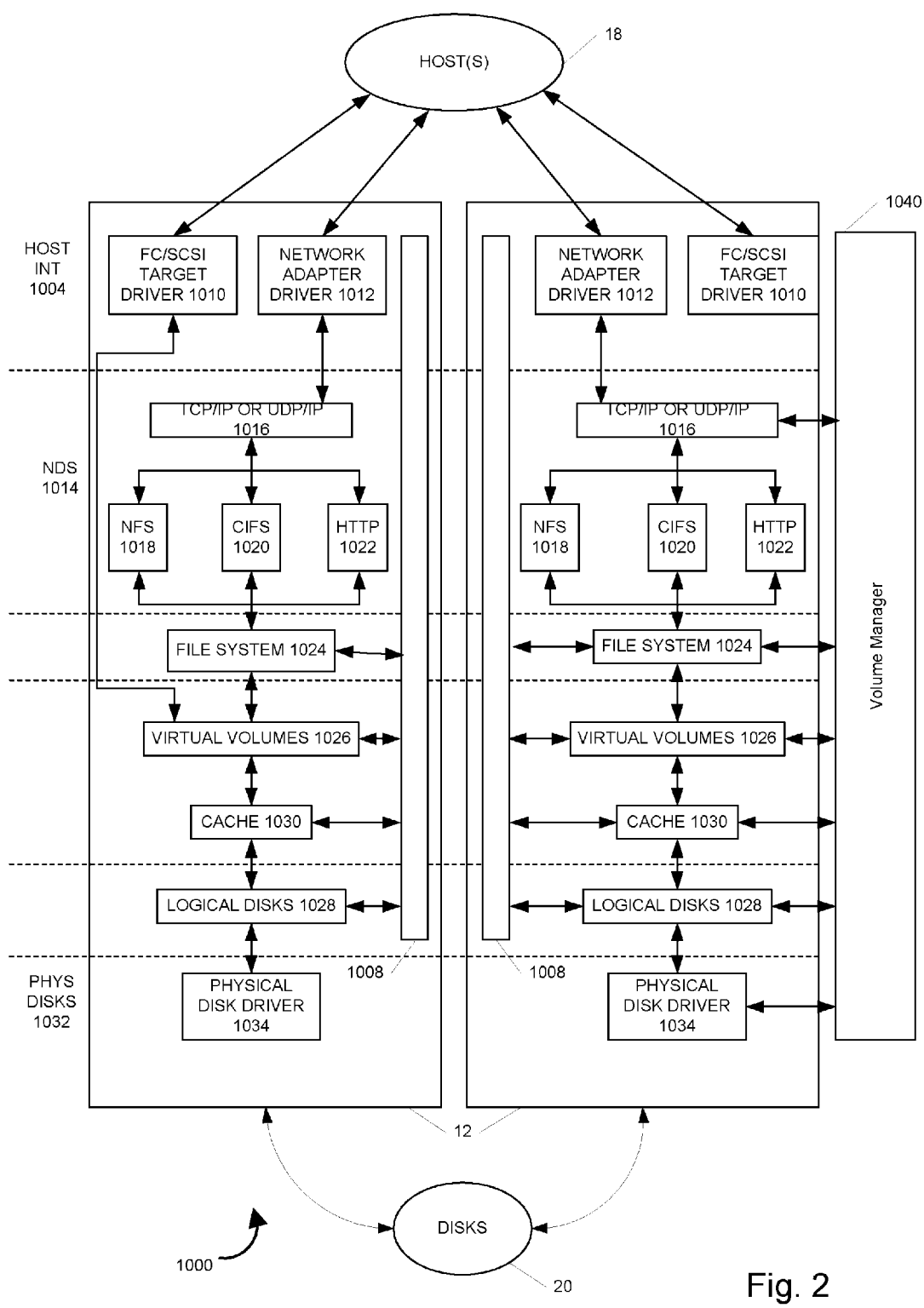
FIG. 2 is a block diagram of a scalable cluster data handling software architecture.

FIG. 2 is a block diagram of a scalable cluster data handling software architecture 1000. This software architecture 1000 may be used in scalable cluster data handling system 10 of FIG. 1. The scalable cluster data handling software architecture 1000 may be implemented on one or more nodes 12 and is configured to supply reliable, high-performance storage services for transferring data between host devices 18 (e.g., processors) and storage devices 20 (e.g., physical disk drives). The storage services can be either the abstraction of raw disks via Small Computer Serial Interface (SCSI) commands, for example over Fibre channel or parallel SCSI, or higher level access protocols or network data services such as NFS, CIFS/SMB or HTTP.

The scalable cluster data handling software architecture 1000 complements primary data storage functions with additional storage support functions such as server-less backup, remote mirroring, and volume cloning. In addition to the storage and storage support functions, the scalable cluster data handling software architecture 1000 supplies administration and management tools that automate tuning and recovery from failure, and supply centralized system management and monitoring.

A host interface layer 1004 connects the host devices to the scalable cluster data handling software architecture 1000. The host interface 1004 can include Fibre Channel/SCSI (FC/SCSI) target drivers 1010 and network adapter drivers 1012. File systems 1024 communicate with the host interfaces 1004 via network data services 1014. The network data services 1014 can include TCP/IP or UDP/IP 1016 services, as well as NFS 1018, CIFS 1020, and HTTP 1022. NFS 1018, CIFS 1020, and HTTP 1022 can be used to access the file systems 1024.

Storage in the scalable cluster data handling software architecture 1000 also includes one or more virtual volumes 1026, logical disks 1028, and physical disk layers 1032. Associated with the virtual volumes 1026 are caches 1030. The physical disk layers 1032 include physical disk drivers 1034, which provide an interface for physical disk drives. Physical disks are logically divided into pieces called "chunklets" (described below in more detail). In an illustrative embodiment, chunklets are fixed-size, for example 256 MB contiguous segments of disk space. The logical disks 1028 are connected to the FC/SCSI target drivers 1010 as well as the file systems 1024. Logical disks 1028 comprise multiple chunklets organized into groups. A logical disk driver (not shown) controls operation so that the chunklets in a RAID group are arranged on different spindles and, if possible, on different Fibre channel strings. Some spindles may not be connected to a Fibre channel loop on the node. The disk caches 1030 can also be abstracted as logical disks 1028.

Virtual volumes 1026 are representations of data storage. The virtual volumes 1026 are an abstraction of the scalable cluster data handling software 1000 that are accessible directly by the hosts devices via the FC/SCSI target drivers 1010, or accessible internally by the file systems 1024. Virtual volumes 1026 provide high-performance by virtue of performing caching and optimized RAID level mappings in addition to basic, uncached fixed-RAID service supplied by logical disk abstractions. A virtual volume manager 1040 may be in communication with various components of the scalable cluster data handling software architecture 1000. Virtual volume manager 1040 general functions to configure, set-up, and otherwise manage virtual volumes 1026. Virtual volume manager 1040 may map blocks (or regions) of the virtual volumes 1026 onto blocks on logical disks 1028. The mapping can be used to cache selected blocks of a virtual volume, place selected regions of the virtual volume 1026 on higher performance RAID groups, and create point-in-time images (snapshots) or clones of data on virtual volumes 1026.

Virtual Volume Management

Figure 3:
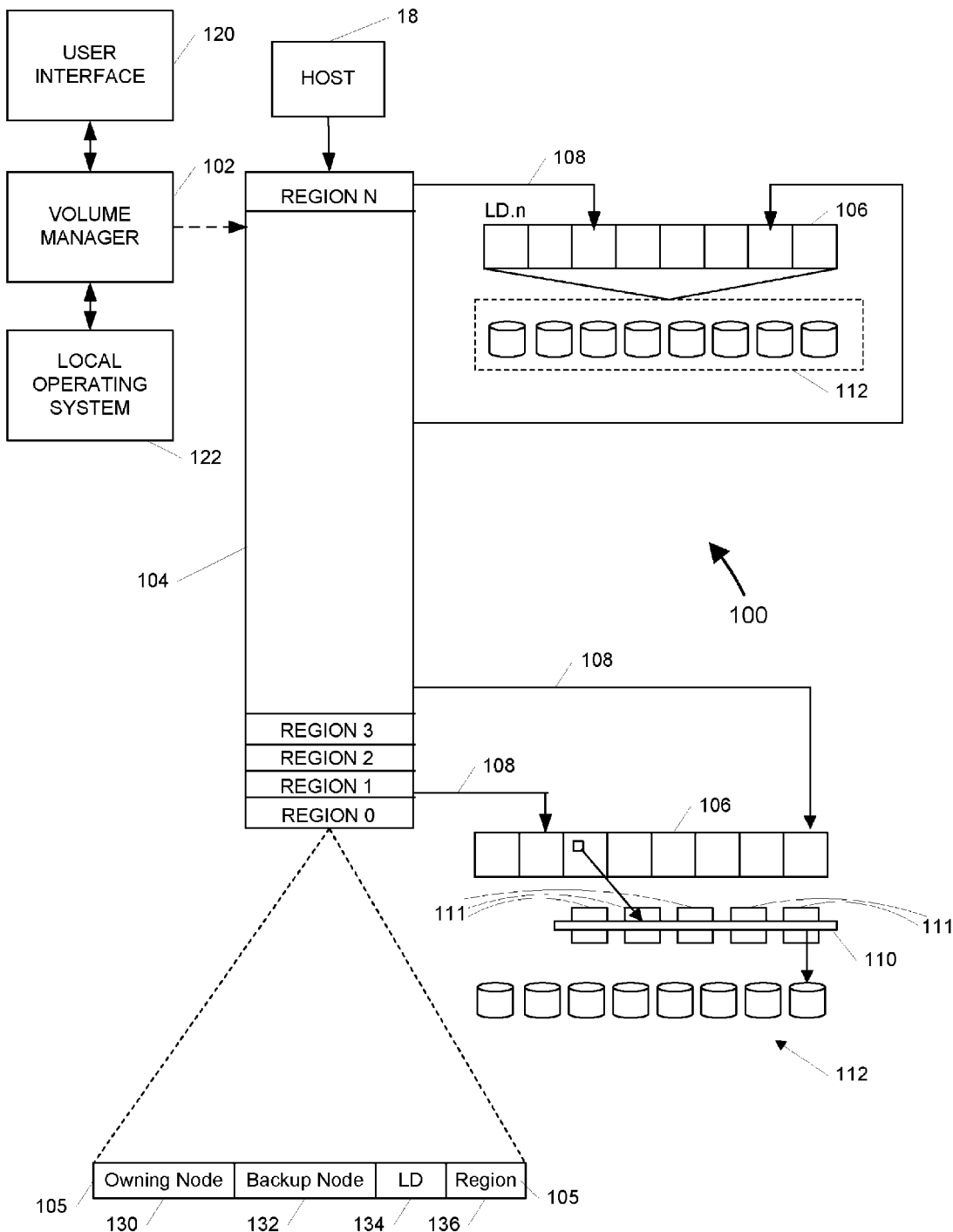
FIG. 3 is a schematic block diagram that illustrates an example of the use of a virtual volume region table for handling data in a data storage management system, according to an embodiment of the present invention.

FIG. 3 is a schematic block diagram that illustrates an example of the use of a virtual volume region table 104 for handling data in a data storage management system 100, according to an embodiment of the present invention. The data storage management system 100 controls data management operations, and can be implemented as part of, for example, scalable cluster data handling system 10. The data storage management system 100 can be implemented, at least in part, as software.

The virtual volume region table 104 is associated with a virtual volume 1026, which is a virtual representation of data storage. In a data storage system served by data storage management system 100, the virtual volume 1026 may represent the collective storage space of a number of hardware storage devices (e.g., physical disk drives 112). The virtual volume region table 104 includes entries 105 for a number of regions (e.g., REGION 0, REGION 1, REGION2, . . . , REGION N) of the virtual volume that correspond to particular storage spaces in the storage devices. In particular, the regions map to one or more logical disks 106 that provide access to a plurality of physical disks 112. The virtual volume region table 104 may be used to record and manage the ownership of regions in a storage structure, such as the virtual volumes 1026, by a one or more nodes 12. In one embodiment, each virtual volume 1026 in a network is associated with its own ownership table.

The virtual volume region table 104 comprises an entry for each region in a virtual volume 1026. Thus, if a virtual volume has 100 regions, then the table 104 has a 100 entries. Each entry in the virtual volume region table 104 stores an indication (e.g., an address) of an owning node (or owner) assigned to the region and an indication (e.g., an address) of a backup node (or replicant) assigned to the region. The owner is the node allocated to track a region of virtual memory stored in the physical storage associated with that owner node. A replicant node functions as a backup to track a region of virtual memory.

In one embodiment, each entry 105 of the virtual volume region table 104 includes one or more elements that provide pointers 108 that point to logical disks 106. As depicted, these elements may include an owning node element 130, a backup node element 132, a logical disk element 134, and a region element 136 for specifying the owning node, the backup node (or replicant), a logical disk, and a region, respectively. A pointer 108 (e.g., LD.id.reg_number) points to a particular logical disk (e.g., LD.id) and a particular region (e.g., reg_number) on the logical disk 106. The virtual volume 104 may thus virtualize all storage on multiple physical disks 112. Present-technology physical disks 112 may have a size of about 1 GB to about 144 GB, so that the virtualization of many physical disks creates an enormous storage space. From a host device's perspective, the virtual volume 104 may be accessed and behave in the manner of a physical disk.

The virtual volume 1026 associated with region table 104 may have a total virtual volume size that is substantially equal to sum of the storage capacity of the hardware storage devices represented. The regions of the virtual volume 1026 (e.g., REGION 0, REGION 1, REGION2, . . . , REGION N) may each correspond to particular storage space. Each region may be the same or different size. In one embodiment, the number of regions in the virtual volume 1026 is equal to the total virtual volume size (e.g., 1 Terabyte) divided by the region size (e.g., 16 Megabytes) divided by the number of nodes (e.g., 8 nodes). Each region of the virtual volume 1026 may be associated with one or more logical disks 106 which, in turn, may be associated with one or more physical disks 112.

The virtual volume region table can be accessed by a host device 18. Furthermore, the virtual volume region table 104 may be accessible, via a volume manager 102, to a user interface 120 or an operating system 122. The user interface can be a graphical user interface (GUI) or a command line interface (CLI). The operating system 122 is local to a scalable cluster data handling system 10 or a node contained therein. This allows files of the virtual volume to be exported/ imported using standard network file systems (e.g., Sun Microsystem's Network File System (NFS) and Microsoft's Common Internet File Service (CIFS)) associated with the operating system 122, or as web pages using hypertext transfer protocol (HTTP).

The volume manager 102 creates, configures, and manages the virtual volume (also called a "virtual disk") that is associated with virtual volume region table 104. To accomplish this, the volume manager 102 may create, modify, and delete entries of the virtual volume region table 104. The volume manager 102 may operate in Fibre Channel, small computer serial interface (SCSI), or other suitable interface, bus, or communication standard environments. In one embodiment, each node 12 in a scalable cluster data handling system 10 has its own separate volume manager 102. In another embodiment, a plurality of these nodes share one or more volume managers 102. In an illustrative example, the volume manager 102 presents the virtual volume (for example, over Fibre Channel) to one or more hosts 120.

The virtual volume is more reliable than physical disks because the volume manager 102 may implement a redundancy scheme that activates redundant replacement storage in the event of disk failure. The virtual volume can be much larger than a single physical disk and have a size that can change dynamically through operations of the volume manager 102. Also, the virtual volume can be enlarged in a relatively seamless manner. The virtual volume provides improved access performance and much lower latencies in comparison to physical disks, if for example, the virtual volume is accessed with patterns that are amenable to caching. The virtual volume may have a much higher bandwidth than physical disks. The virtual volume may be accessed over multiple interfaces, such as multiple Fibre Channels or SCSI links. Multiple interfaces for the virtual volumes permits performance of the virtual volume to exceed that provided by a single channel and allows continued availability of volumes following failure of one of the links. The virtual volume may be cloned to create copies of the original volume. Since any region of the virtual volume can be mapped to essentially any logical disk 106, the logical disks 106 can be configured to achieve specific performance criteria, depending on characteristics of the data access operations to be performed. Data access characteristics include occurrence frequency of the operations, volumes of data to be processed, sparseness or concentration of data accessed in an operation, and the like.

In an illustrative operation, a host device 12 addresses the virtual volume as a single memory via the virtual volume region table 104. The region table 104 may map a region (e.g., REGION 0) of the virtual volume onto one or more logical disks 106 for any storage location. The volume manager 102 uses the virtual volume 104 to translate a virtual volume address to a logical disk address, and then to a physical storage location on a physical disk 112 by indexing into a virtual volume region table 104.

In one embodiment, the volume manager 102 creates the mappings from the regions of the virtual volume 104 (e.g., REGION 0 through REGION N) to one or more logical disks 106 and/or cached block locations in cluster memory (of one or more nodes). This allows logical disks 106 to be directly accessible by host devices 120. Mapping allows the virtual volume 104 to extend through multiple logical disks 106. Virtual volume mapping also allows an extremely large number of blocks to be cached with cache blocks located in the cluster memory of any node.

Virtual volume mapping enables additional storage functionality including creation of a "virtual volume clone" at another node or at another cluster data handling system. A "virtual volume clone" may be a copy of a virtual volume's mapping, and can be both read and written. In one embodiment, when a virtual volume clone is first created, the virtual volume clone only includes a copy of the original virtual volume's mapping, which is a small record that is quickly created and consumes almost no additional storage space. Accordingly, data of the virtual volume clone is accessed indirectly from the original virtual volume. When data is written to the original virtual volume or the virtual volume clone, new physical storage blocks are allocated for the virtual volume clone. The mapping is changed only when particular disk blocks are written in either the virtual volume clone or the original virtual volume. If only a small fraction of total virtual volume size is written, then the additional memory space used by the clone is small.

An alternative technique for virtual volume cloning creates clones by physically copying the entire volume, which consumes the same physical disk space in the clone as is used in the original volume. Another alternative technique for virtual volume cloning utilizes read-only copying of a file system, not copying of physical storage. The read-only copies are adequate for some purposes such as backups, but read-write copies are required for purposes such as application testing on actual data.

The data storage management system 100 may be managed by backup software executed on the nodes. In an illustrative embodiment, the nodes run a general-purpose operating system that permits operation of commercially-available software products. The data storage management system 100 can be directly connected to a tape library (not shown) and data can be directly transferred between disk and tape.

In one embodiment, the data storage management system 100 may operate in a different manner for accesses of unprocessed virtual volumes and of virtual volumes implemented with file systems. For unprocessed virtual volumes, backup software typically runs on a server and sends extended block copy commands to the data storage management system 100 to directly transfer blocks between virtual volumes and tape. Since the data that is backed up does not traverse the network to extend to the server and return again from the server to the tape library, server network bandwidth is greatly reduced, and the server is not burdened with the backup task. Volume backup is also facilitated by virtual volume cloning.

Figure 4:
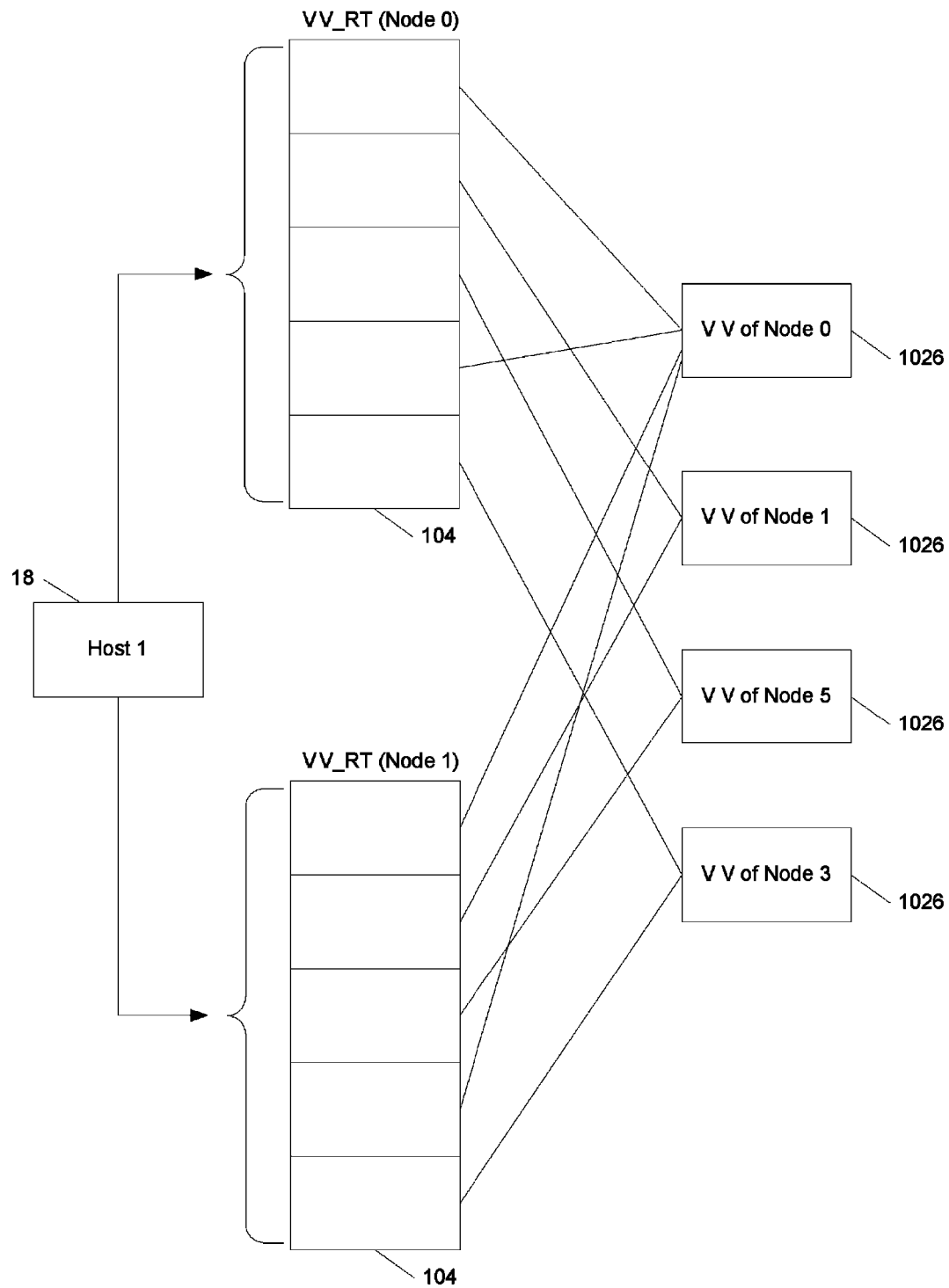
FIG. 4 illustrates the access to the virtual volumes of multiple nodes by a host device through the virtual volume region tables on several nodes.

FIG. 4 illustrates the access to the virtual volumes 1026 of multiple nodes 12 by a host device 18 through the virtual volume region tables 104 on several nodes 12. Each host device 18 may have one or more virtual volume region tables 104 for mapping to respective virtual volumes 1026. Each virtual volume region table 104 may be stored locally at its associated node 12 (owner node) and also one or more backup nodes 12 (replicant nodes). The virtual volume region tables 104 provides mappings between the respective virtual volumes and one or more logical or physical disks. Each node 12 may use its virtual volume region tables 104 to update and manage data stored in the physical disks.

The owning node 12 stores or manages a virtual volume. Replicant nodes maintain copies of the virtual volume. The owning node may be responsible for maintaining coherency of data in the various copies of the virtual volume maintained at the owning node and the one or more replicant nodes.

In one embodiment, the owning node maintains coherency by managing the control and data structures (e.g., level mapping tables, described herein) that specify the location of data blocks, and the virtual volume region tables 104 that specify the nodes 12 responsible for particular data blocks. The owning node sends messages to other nodes, informs the other nodes of access to the owning node's physical storage, and requests/coordinates updating of tables and data structures at the other nodes. The owning node may await acknowledgements from the other nodes to ensure that all nodes have coherent tables and data structures. Thus, consistency of copies of the virtual volume are maintained across multiple nodes.

In one embodiment, any operation to write data to a particular area or page of storage in a virtual volume causes such data to be written into the copies of the virtual volume at each of the owning node and the replicant nodes.

In an illustrative embodiment, data can be written to a virtual volume by indexing into the respective virtual volume region table 104 to determine which nodes 12 are the owning and replicants node for the virtual volume. The write operation is executed and a copy of the data is sent to the owning and replicant nodes. The virtual volume region table 104 can be used to determine the replicant node so that, in case a block write operation fails, the redundant copy of the data can be accessed. In an illustrative embodiment, each of the nodes 12 in a system has a copy of the virtual volume region table 104 for other nodes and tracks the replicant nodes for various data blocks.

In one embodiment, if a node 12 fails, the volume manager 102 uses the virtual volume region table 104 to provide access to redundant data of the virtual volume through the replicant node. The replicant node may access the virtual volume region table 104 and other data management structures to determine how to derive information in case of failure. For example, the replicant node can access information such as transaction logs for error recovery when a failure requires the replicant node to assume management conditions of a failing owner node.

Backup copies (which may be referred to as "backup volumes") of the virtual volume may be stored or managed in the owning and replicant nodes 12. Each backup volume may comprise a complete copy of the virtual volume at a particular point in time. The backup volumes can be used in the event that the associated base virtual volume becomes inaccessible. This may be the case, for example, when there is a system failure in the owning node that requires disaster recovery.

In an illustrative embodiment, a host device 18 may use the virtual volume region tables 104 of any node 12 to which the host device 18 is connected. Thus, for example, if Host 1 is connected to Node 0 and Node 1 (as shown in FIG. 1), then Host 1 may use table VV_RT (Node 0) or table VV_RT (Node 1).

In one embodiment, the nodes 12 may use their virtual volume region tables 104 as "hash" tables to perform a hashing operation. That is, a virtual volume region table 104 may implement a hash function, such as a transformation h from an input index m to a fixed-size string H(m). Hash functions can have a variety of general computational uses, and may be used to identify data owner nodes and data replicant nodes, for example in a cache lookup operation. Each node 12 may be designated as an owner node or a replicant node for a set of storage devices (e.g., disk drives). The virtual volume region table 104 may hold an array of control indices or virtual volume offsets that map data to physical storage locations, such as the physical disks 112. Entries in a virtual volume region table 104 may identify nodes 12 that control and store owner and replicant tags that define a location of data storage on physical disks 112 and redundant paths for accessing the data.

Snapshots

As data and information is stored into the various virtual volumes 1026 in the storage system supported by data management system 100, one or more "snapshots" may be taken of each virtual volume 1026 to record the history of what has been stored in that virtual volume 1026. A snapshot can be a point-in-time picture of the virtual volume at the time that the snapshot is taken. A snapshot can record the state of saved memory including the contents of all memory bytes. Snapshots of the virtual volume 1026 may be used to restore the data storage system in the event of failure. For example, snapshots enable previous versions of files to be brought back for review or to be placed back into use. Snapshots of the virtual volume 1026 can be taken at regular intervals, or based upon particular triggering events (e.g., upon some indication that the system is about to crash).

In one embodiment, any data changes in a base virtual volume after an initial point in time may be reflected in a snapshot. Thus, each snapshot may reflect the difference between what is stored in the virtual volume 1026 at one moment of time versus another moment of time. A first snapshot of the virtual volume may correspond to the state of the base virtual volume of data (and mappings) at a time X. A second snapshot of the virtual volume may correspond to the state of the base virtual volume (and mappings) at a time Y. In some cases, any changes or writes of data to the base virtual volume between time X and time Y can be determined by comparing the first snapshot to the second snapshot.

In one embodiment, a copy-on-write (COW) technique can be used in conjunction with the snapshots. In a COW technique, a data page or block is copied to a snapshot before that data block is modified by any write operations. Generally, only the first write operation to a given data block causes a COW operation ("a COW push") to a snapshot. Subsequent write operations to that data block are allowed to directly change a base virtual volume. Alternatively, a complete copy of all the data blocks is made to the snapshot. After the complete copy, all of the data blocks can be modified.

Figure 5:
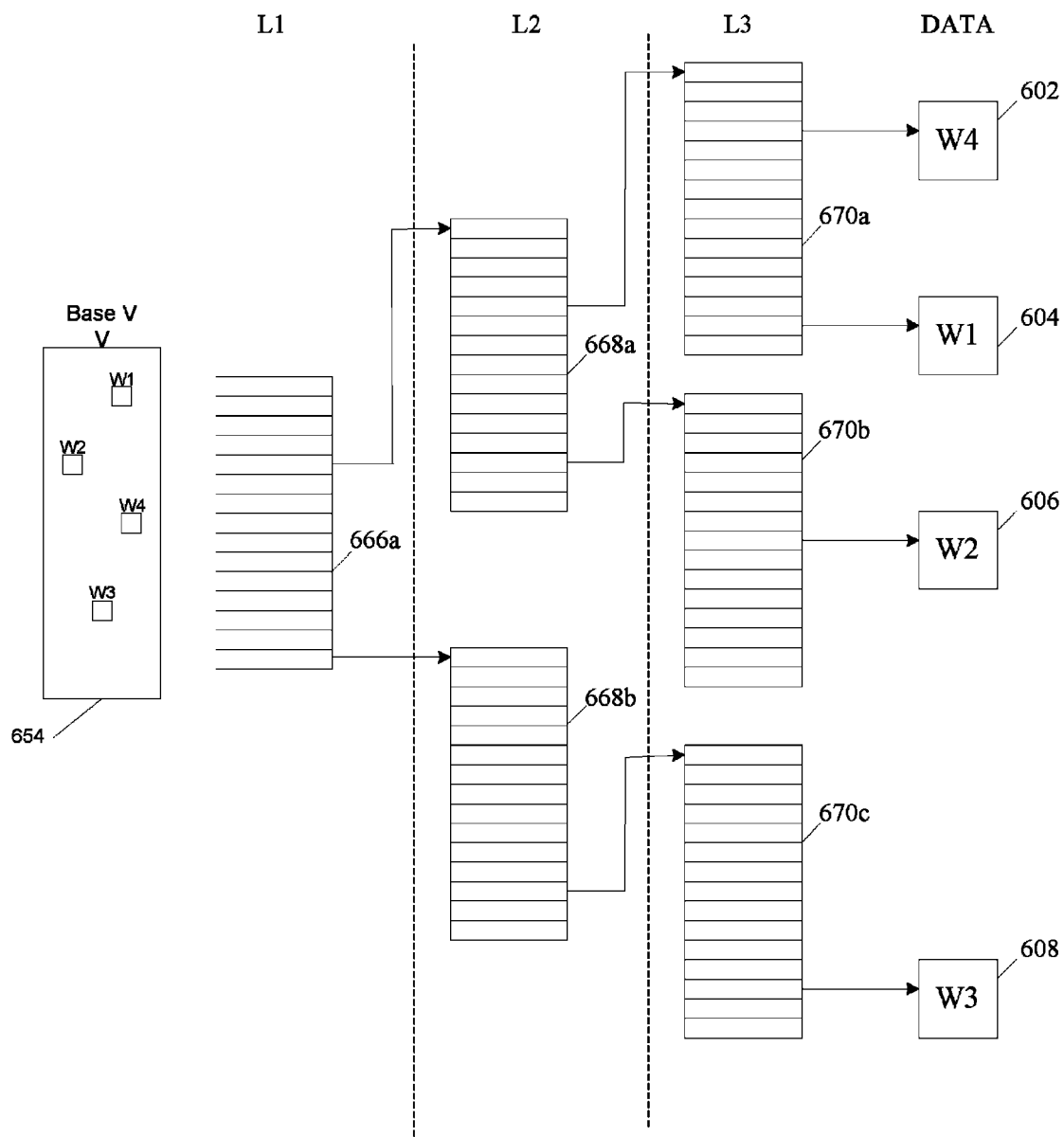
FIG. 5 illustrates a number of data structures for a snapshot technique that may be created as data is written or modified in a base virtual volume.

FIG. 5 illustrates a number of data structures that may be created and modified as data is written or changed in a base virtual volume 654. As depicted, these data structures include a number of tables arranged in a hierarchy of multiple levels (e.g., Level 1, Level 2, and Level 3). At Level 1, there is a table

666a. At Level 2, there are tables 668a and 668b. At Level 3, there are tables 670a, 670b, and 670c. Although three levels are shown, it should be understood that in other embodiments the hierarchy may comprise any number of levels. The base virtual volume 654 may be the most current version or state of a virtual volume 1026.

The tables 666, 668, and 670 may be used to track any data changed or written to the base virtual volume 654 for one or more snapshots. As depicted, four write operations are made to write data (e.g., W1, W2, W3, and W4) into various parts of the base virtual volume 654. In the illustrative example, each of these write operations to the base virtual volume 654 cause the data which was modified to be captured in a snapshot, which can be the same or different snapshots for the various write operations. Data for the various snapshots is stored in data storage areas 602, 604, 606, 608, which can be in physical storage devices (e.g., physical disks 112) or in virtual volume memory. Each data storage area 602, 604, 606, or 608 can be a page of data which, in one embodiment, may comprise one or more disk or data blocks. A data block can be the minimum size or region of data accessible from a physical storage device. Taken together, the tables at the various levels and the data storage areas may provide a snapshot of data written to multiple physical disks using virtualized disk operations. In some embodiments, creation and modification of the tables 666, 668, and 670 may be controlled by a "master" node 12, which has a backup master node in case the master node malfunctions or is inaccessible.

In an illustrative embodiment, Level 1 (or L1) table 666a is a first level mapping structure. The table 666a comprises a plurality of entries (e.g., 1024). Each entry in the Level 1 table 666a addresses a range of memory locations (or segments) of the entire base virtual volume 654. Each segment may, for example, comprise 1000 memory locations of the entire base virtual volume 654. Assuming that there are 10 entries in the Level 1 table 666a, a first entry (entry 0) addresses locations 0-99 of the base virtual volume 654 (which may correspond to a first Level 2 table), a second entry (entry1) addresses locations 100-199 (which may correspond to a second Level 2 table), and so on. Each Level 2 table 668a, 668b may comprise a plurality of entries (e.g., 10), each of which corresponds to a particular range of memory locations within the segment of the Level 1 entry pointing to that Level 2 table. For example, a first entry of a Level 2 table may address locations 0-9 of the base virtual volume 654 (which may correspond to a first Level 3 table), a second entry of the same table may address locations 10-19 (which may correspond to a second Level 3 table), and so on. Each Level 3 table may also comprise a number of entries (e.g., 10), each of which points to a particular storage area (e.g., 602, 604, 606, or 608) storing data that was changed or written. In one embodiment, each Level 2 table is controlled by a specific node 12, which may also control the Level 3 tables associated with that Level 2 table.

The structures and techniques described herein are highly suitable for identifying storage locations and accessing widely separated and sparsely concentrated physical storage devices accessible by a virtual volume. Data snapshots typically involve changes to only a small portion (e.g., 1% or less) of the entire storage space of virtual volume, where the data changes occur at locations that are generally widely separated. In one embodiment, data structures for the snapshots are recursive so that further tables for snapshot volume are created only when write accesses are made to those particular levels.

This can be accomplished by the volume manager accessing and attempting to check entries in the tables 666, 668, and 670 to determine whether a particular physical block has previously been written. For example, in an illustrative embodiment, if data is written to a storage location of the base virtual volume 654 that falls within a particular segment, the volume manager 102 first reads the entry of the Level 1 table 666 that corresponds to the target physical storage. If the entry is null/empty, thus indicating no previous writes to that location, the volume manager 102 sets a pointer in the corresponding entry of the Level 1 table 666a and creates a Level 2 table 668. The pointer in the Level 1 table 666a points to an entry in the Level 2 table (e.g., table 668a or 668b) for further specifying the specific location of the base virtual memory 654. Tables and corresponding entries for other levels (e.g., Level 3 table 670) are generated and made. An entry in the final level table specifies the storage location, which may be in a virtual volume 1028. With the entries, pointers are set in the various tables, and a page of data is written to the physical storage area. Alternatively, if the entry of the Level 1 table 666 is not null/empty, the volume manager 102 designates or creates a pointer to an existing element of a Level 2 table (e.g., table 668a or 668b). The volume manager 102 reads the element of the Level 2 table 668 that corresponds to the target physical storage. If this entry is null/empty, the volume manager 102 creates a new Level 3 table 670; otherwise, the volume manager 102 uses the element as a pointer to an existing Level 3 table. This is continued for all level until a page of data is written to the physical storage area.

The various level mapping tables (e.g., Level 1, Level 2, and Level 3 tables) may be considered exception tables. This is because, in some embodiments, entries in the level mapping tables only exist if data has been change or written (which is considered an exception, rather than the norm) in the respective storage areas.

The state of data for the virtual volume 1026 at a specific time can be brought back or placed into use by accessing the data for a snapshot created at that time.

The tables 666a, 668a, 668b, 670a, 670b, and 670c can illustrate an example of copy-on-write operations that result in data (W1, W2, W3, and W4) being stored in the data storage areas 602, 604, 606, and 608. A first data write operation to a location in the base virtual volume 654 causes a copy of the data W1 to be stored in storage area 604. Storage area 604 is addressed by the tables 666a, 668a, and 670a. A second data write operation causes a copy of data W2 to be stored in storage area 606. The second data storage area 606 is addressed by some of the same tables as storage area 604 (i.e., tables 666a and 668a) and a different table (table 670b). A third data write operation causes a copy of data W3 to be stored in storage area 608. The data storage area 608 is addressed by tables 666a, 668b, and 670c. A fourth data write operation causes a copy of data W4 to be stored in storage area 602. The data storage area 602 is addressed by the same tables as storage area 604 (i.e., 666a, 668a, and 670a).

The copy-on-write technique can be implemented by creating and managing the hierarchy of tables 666, 668, and 670 which ultimately point to data storage areas 602, 604, 606, 608. Specifically, for each copy-on write operation, a volume manager 102 may determine if a particular area of storage was previously written. If the area was not previously written, the volume manager 102 creates appropriate tables at the various levels for that storage area. Otherwise, if the area was previously written, all appropriate tables should already have been created, and the volume manager 102 functions to add or modify entries in the tables to reflect the data changes to the virtual volume 654.

In an illustrative example, if a node 12 receives a write request to a particular region of a virtual volume, the owning node of the virtual volume determines whether there are entries for the region in one or more level mapping tables (e.g., Level 1, Level 2, or Level 3 mapping tables). If no such entries exist, then the owning node reads the data at the target region in the base virtual volume, creates appropriate tables and entries, and writes information for the tables and entries into a snapshot volume. The owning node then writes the new data block to the base virtual volume and sends an acknowledge signal to the node that received the write request.

In one embodiment, snapshot techniques can be used in conjunction with cloning techniques in the data storage system. The data storage management system 100 may generate remote mirror copies or "clones" of data on virtual volumes 1026 and logical disks 106 in the multiple nodes 12. The system 100 manages remote mirror cloning of data segments of a virtual volume 1026 by creating local and remote mirror data structures (which may include various level tables and snapshot data). When a clone is first created, the system allocates storage space for a clone structure resident on or controlled by a remote node 12 that corresponds to the data structure in the local node 12. The system stores header or management information that defines the local and remote structures as mirror copies. When data is subsequently written to the storage structures of one of the local or remote nodes 12, information is transferred to the other node 12 so that the same data is written to the clone.

In one embodiment, the data structures (e.g., L1, L2, L3 tables and W1, W2 data storage spaces or pages) for snapshots of a virtual volume 1026 can be stored various volumes of memory (which themselves can be virtual or real).

Figure 6A:
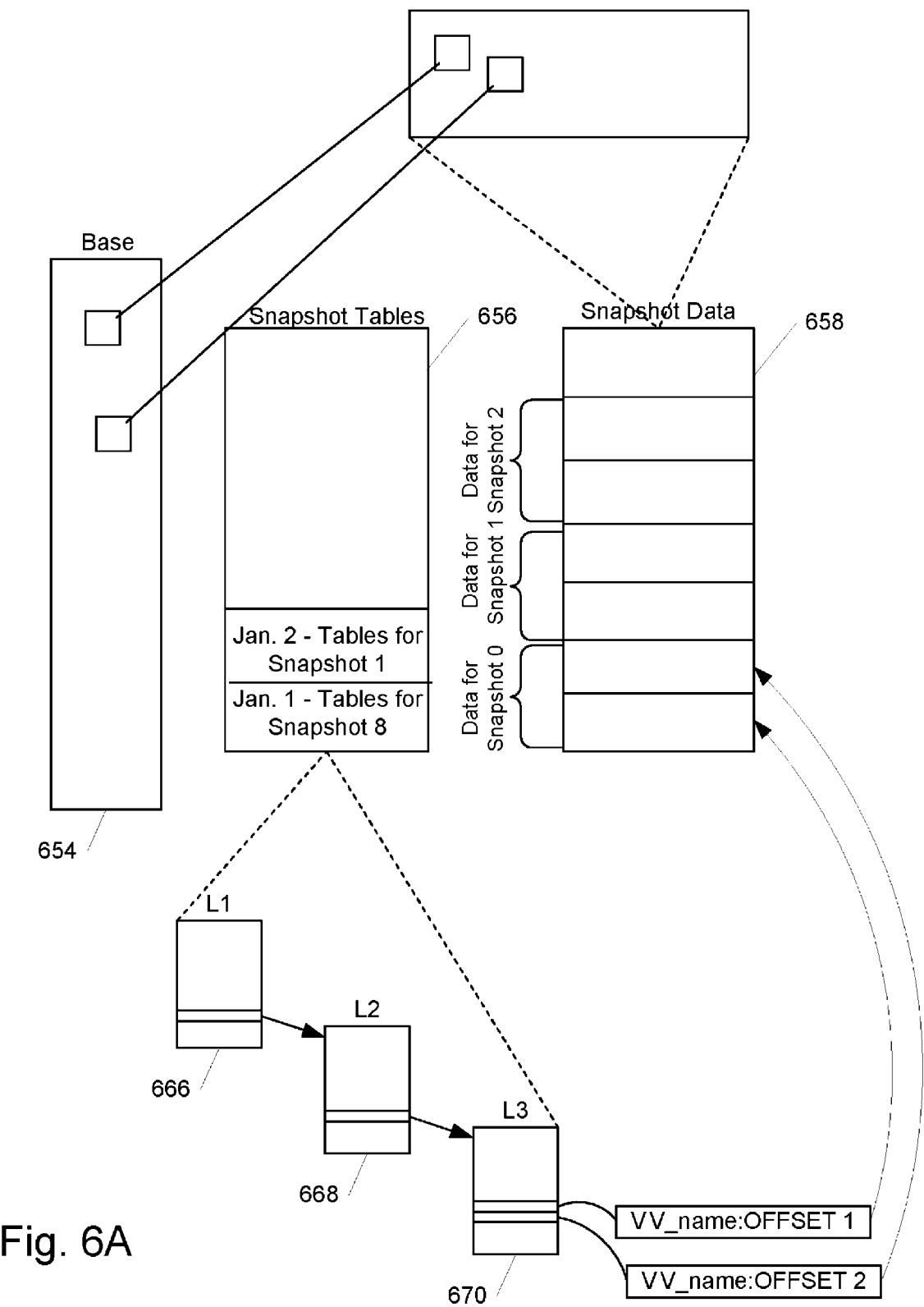
FIG. 6A illustrates one view of storage volumes for the data structures of FIG. 5.

FIG. 6A illustrates one view of storage volumes for the data structures for a snapshot technique. As depicted, these may include a base virtual volume 654, snapshot administration volume 656, and snapshot data volume 658 for various snapshots.

The base virtual volume 654 may be the most current version of a virtual volume 1026. Thus, the base virtual volume 654 may comprises data stored in the virtual volume at some initial point in time, such as time X (or time 0), and any data that has been subsequently written by a host after time X. The base virtual volume 654 is associated with a virtual volume region table (e.g., virtual volume region table 104) that maps regions of the base virtual volume 654 to physical storage devices (e.g., physical disks 112). The base virtual volume 654 may specify or include virtual data structures of all physical storage devices in communication with a plurality of nodes 12 in a data handling system 10. As an example, a base virtual volume 654 of a multi-node system may comprise 1 Terabyte ("1T") of data. As data in the base virtual volume 654 is changed or modified over time, various snapshots can be taken to provide a history of what has been stored in that virtual volume at different moments.

Snapshot data volume 658 stores data for each snapshot—i.e., data that has been written/changed in the base virtual volume 654 from an initial point in time to when a snapshot is taken. As depicted, separate data may be stored for each snapshot of the virtual volume. The snapshot administration volume 656 stores a number of tables 666, 668, and 670 in a hierarchy with multiple levels (e.g., Level 1, Level 2, and Level 3). The different levels of tables may map the data of a snapshot back to a particular location of the virtual volume (as described with reference to FIG. 5), so that the state of the base virtual volume at previous point in time can be re-created.

Figure 6B:
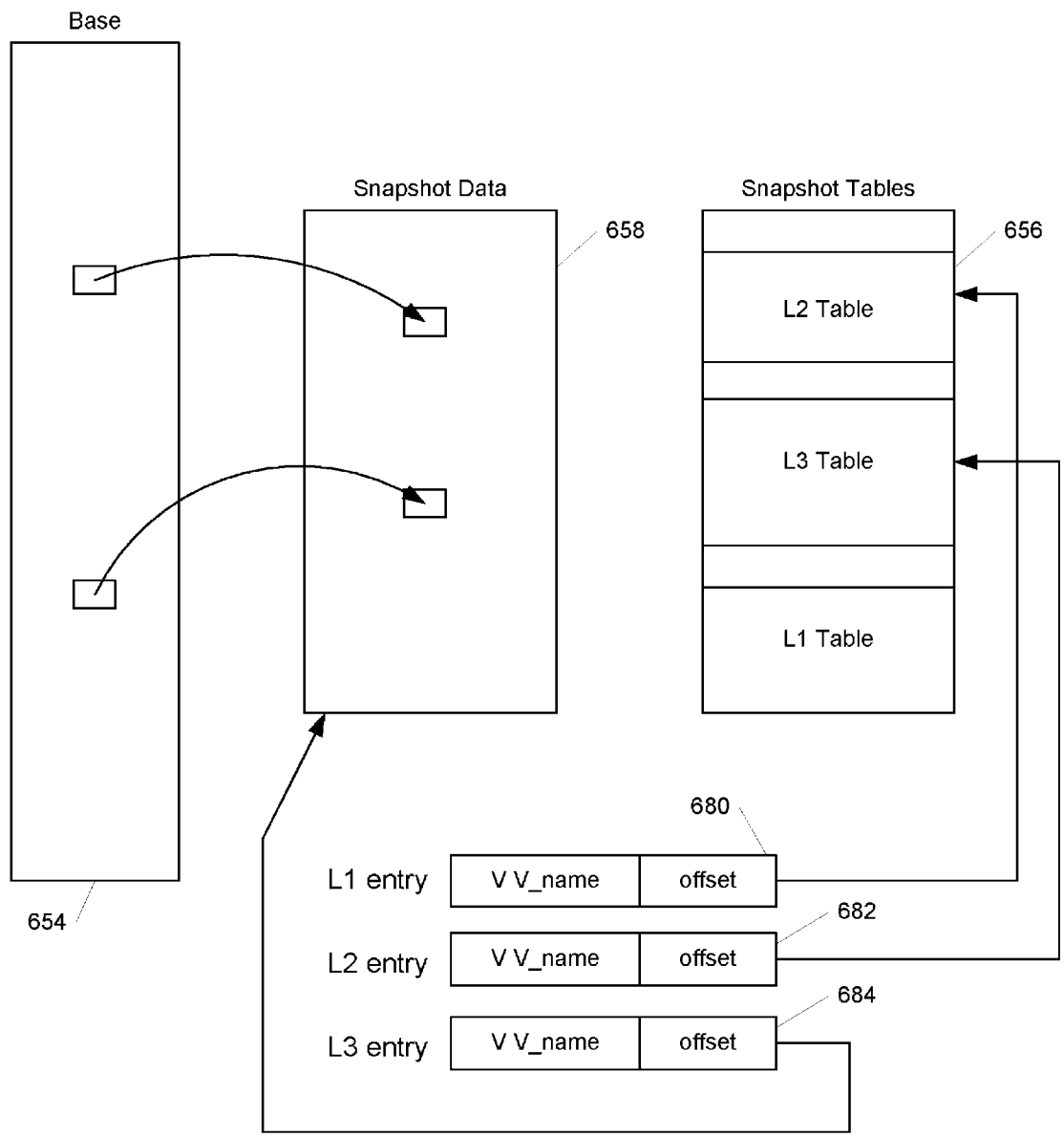
FIG. 6B illustrates another view of storage volumes for the data structures of FIG. 5.

FIG. 6B illustrates another view of storage volumes for the data structures for a snapshot technique. Similar to the view depicted in FIG. 6A, these volumes include a base virtual volume 654, a snapshot administration volume 656, and snapshot data volume 658. Snapshot data (reflecting data changes made to base virtual volume 654) may be stored in any space which is available and accessible in snapshot data volume 658. Likewise, snapshot tables (which map the snapshot data back to the base virtual volume 645 for particular snapshots) may be stored in any available and accessible space of snapshot administration volume 656.

The tables for multiple levels (e.g., Level 1, Level 2, and Level 3) may each contain entries for various snapshots. As depicted, an entry 680 of the Level 1 (or L1) table comprises a virtual volume name (VV_name) and an offset. In one embodiment, this virtual volume name can be the name of the snapshot administration volume 656 and the offset points to a particular entry 682 in an Level 2 (or L2) table. This entry 682 for the L2 table also comprises a virtual volume name and offset. The volume name can be the name of the snapshot administration volume 656 and the offset points to a specific entry 684n. The L3 entry 684 comprises a virtual volume name for the snapshot data volume 658 and an offset which points to specific data (e.g., data page).

Figure 7:
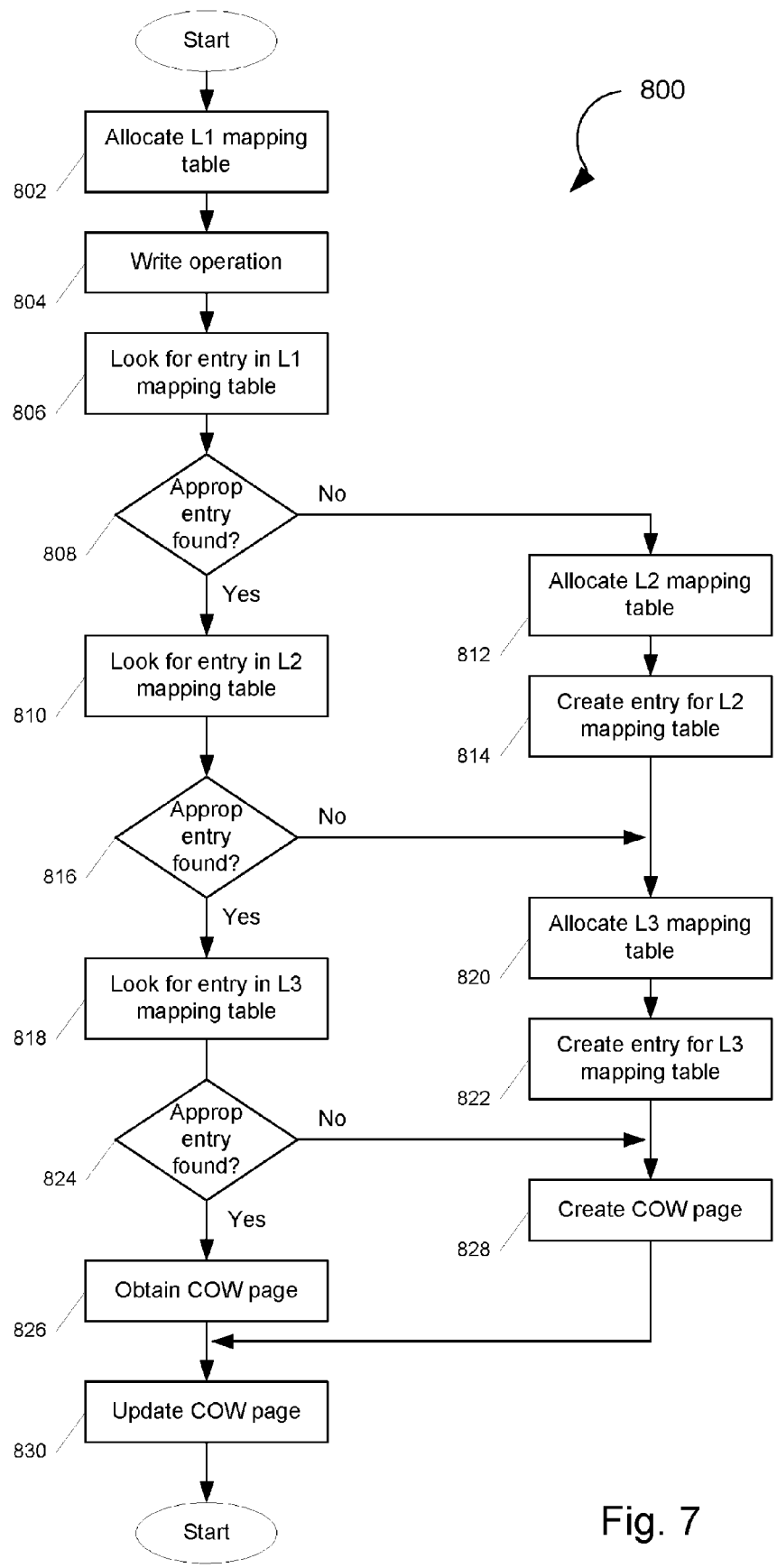
FIG. 7 is a flowchart for an exemplary method for a multiple level mapping for a virtual volume, according to an embodiment of the present invention.

FIG. 7 is a flowchart for an exemplary method 800 for a multiple level mapping for a virtual volume 1026, according to an embodiment of the present invention. In one embodiment, method 800 may be performed by volume manager 102 (FIGS. 2 and 3). This method may cause tables at various levels (e.g., Level 1, Level 2, and Level 3) to be generated or created. Method 800 begins at step 802 where volume manager 102 allocates a Level 1 mapping table for the virtual volume.

At step 804, a write operation is initiated. This write operation may be directed to a particular storage segment or location in the virtual volume. The volume manager 102, at step 806, looks up for an entry in the Level 1 mapping table corresponding to the segment or location. At step 808 the volume manager 102 determines if an appropriate entry for the segment or location exists in the Level 1 mapping table.

If no entry exists, then this location of the virtual volume has not been written to previously for a present snapshot, and accordingly, no Level 2, Level 3, etc. mapping tables would have yet been created or allocated. At steps 812 and 814 a suitable Level 2 mapping table is allocated and an appropriate entry is created. Then at steps 820 and 822 a suitable Level 3 mapping table is allocated and an appropriate entry is created. At step 828 a copy-on write (COW) page for the data is created, after which method 800 moves to step 830.

Alternatively, if at step 808 an appropriate entry is found in the Level 1 mapping table, then the volume manager 102 accesses the Level 2 mapping table to which the Level 1 entry points. At step 810 the volume manager 102 looks for an entry in the Level 2 mapping table corresponding to the particular segment or location of the virtual volume. At step 816 the volume manager 102 determines if an appropriate entry for the segment or location exists in the Level 2 mapping table.

If no entry exists in the Level 2 mapping table, then method 800 moves to steps 820 and 822 where a suitable Level 3 mapping table is allocated and an appropriate entry is created. Thereafter method 800 moves to step 828. Otherwise, if at step 816 an appropriate entry is found in the Level 2 mapping table, then the volume manager 102 accesses the Level 3 mapping table to which the Level 2 entry points. At step 818 the volume manager 102 looks for an entry in the Level 3 mapping table corresponding to the particular segment or location of the virtual volume. At step 824 the volume manager 102 determines if an appropriate entry for the segment or location exists in the Level 3 mapping table.

If no entry exists in the Level 3 mapping table, then method 800 moves to step 828, where a COW page for the data is created. Otherwise, if at step 824 an appropriate entry is found in the Level 3 mapping table, then the volume manager 102 obtains the COW page to which the Level 3 entry points.

At step 830, the COW page is updated. Thereafter, method 800 ends.

Accordingly, the various mapping tables (for Level 1, Level 2, and Level 3) provide the management of COW pages for the virtual volume. Because at least some of the mapping tables are not allocated until they are needed, disk resources are only used or committed when a COW happens and memory resources are committed only when a reference to a particular storage area is made.

Additional details regarding the scalable cluster data handling system, its nodes, virtual volume management, and snapshots are provided in co-pending U.S. patent application Ser. No. 09/633,088, entitled "Data Storage System", filed on Aug. 4, 2000; U.S. patent application Ser. No. 09/883,681, entitled "Node Controller for A Data Storage System", filed on Jun. 18, 2001; and U.S. patent application Ser. No. 10/655, 963 entitled "Efficient and Reliable Virtual Volume Mapping". These applications are assigned to the same Assignee as the present application and are hereby incorporated by reference in their entireties.

Base and Snapshot Volumes

Figure 8:
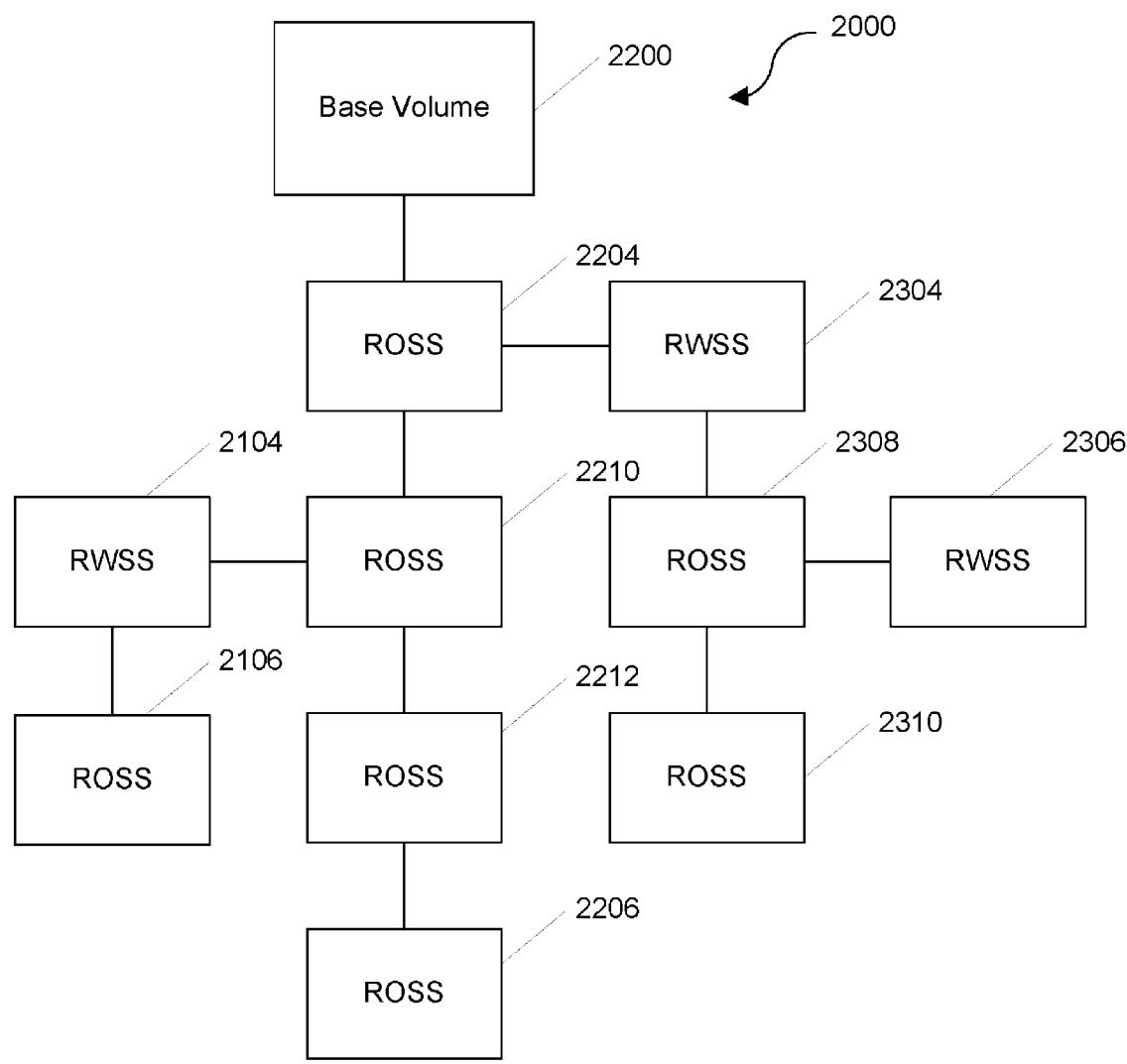
FIG. 8 illustrates a snapshot tree descended from a base volume.

FIG. 8 illustrates a snapshot tree 2000 for a virtual volume 1026. One or more snapshot trees may be generated or provided for each virtual volume 1026 that is maintained in a data storage system. As depicted, snapshot tree 2000 includes a base virtual volume 2200 and a series of snapshot volumes 2104, 2106, 2204, 2210, 2212, 2206, 2304, 2308, 2310, and 2306.

Base virtual volume 2200 can be written into and read from by a user or host device 18. The base virtual volume 2200 may be the most current version of the respective virtual volume 1026, and most reads and writes of data are performed on the base virtual volume. From another perspective, base virtual volume 2200 comprises data initially stored at a point in time, such as time X (or time 0), and any data that has been subsequently written by a host device or user after time X. Base virtual volume 2200 may serve as a "root" for the snapshot tree 2000.

Each snapshot volume maintains data and tables for an associated snapshot of the base virtual volume. As such, for snapshot tree 2000, the snapshot volumes may be considered to "descend" from a base virtual volume 2200. Any of the snapshot volumes can be accessed to obtain data that was written at a prior time. A snapshot volume can be either a read-only (R/O) snapshot volume (or ROSS) or a read/write (R/W) snapshot volume (or RWSS). A ROSS presents a constant view of the data in a virtual volume at a specific time. After creation of a ROSS, data can be read from but not written into the ROSS. A RWSS descends from a ROSS (e.g., a parent snapshot volume) and may serve to hold modifications to the parent ROSS. A RWSS can be read and written like a base virtual volume. As such, a RWSS can be viewed as a writable/modifiable version of its parent ROSS. As shown, snapshot volumes 2106, 2204, 2210, 2212, 2206, 2308, and 2310 are ROSSes, and snapshot volumes 2104, 2304, and 2306 are RWSSes. Each of the RWSSes may have one or more descending ROSSes. As can be seen, for example, a RWSS 2306 can descend from a ROSS 2308 of another RWSS 2304.

The snapshot volumes may be grouped in branches. A branch is made up of a read-write volume (either base virtual volume or RWSS) as its base and one or more read-only snapshot volumes maintained in a time-ordered link attached to the read-write volume. Thus, referring to FIG. 8 for example, a branch can be the base virtual volume 2200 and a sequence of read-only snapshots volumes, such as the ROSSes 2204, 2210, 2212, and 2206. A branch may also be a read/write snapshot volume, such as a RWSS 2304 and one or more read-only snapshot volumes, such as the ROSSes 2308 and 2310. A new branch can be created by adding a read-write snapshot volume to a read-only snapshot volume, after which read-only snapshot volumes can be added to grow the branch. For any given branch, the snapshot volumes extend from oldest to most recent. For example, in the branch comprising base volume 2200 and snapshot volumes 2204, 2210, 2212, and 2206, snapshot volume 2206 is the oldest (created earliest in time) while snapshot 2204 is the most recent (created last in time).

A snapshot volume may be created or started by execution of a command from the volume manager 102, a node 12, or a host device 18. For example, at one point in time, the volume manager 102 may execute a command that causes the creation of a first snapshot volume (e.g., snapshot volume 2206). At subsequent points in time, the volume manager 102 may execute other commands which can similarly result in creation of additional snapshot volumes (e.g., snapshot volumes 2212, 2210, and 2204). Thus, for example, a second snapshot volume (e.g., snapshot volume 2212) stores data that has been more recently changed or modified than data in the first snapshot volume.

If return to a particular state of memory is desired, a snapshot volume corresponding to the snapshot for the particular state is accessed. In this way, copy-on-write operations can be reversed.

In one embodiment, data of a virtual volume may be read in a manner opposite to a write, for example, by accessing the data from the base virtual volume 2200 and one or more snapshot volumes, as desired. A data block from the base virtual volume 2200 may be accessed by simply reading the physical storage designated by the base virtual volume mappings (e.g., from a virtual volume region table 104). A data block from a snapshot volume may be accessed by reading through the level mapping tables (i.e., from the Level 1 table to the last level table, such as, for example, Level 3 table). If the entries in the tables of the snapshot volume associated with the data block are not zero, then an pointer for that element exists and can be used to read the stored data from the snapshot volume.

Each of the volumes in the snapshot tree from one that is under consideration up to the base volume may be analyzed in turn to see whether the data block was modified during the respective snapshots. The snapshot volumes are read until a pointer value that is not zero is available or the base virtual volume is reached. That is, for each snapshot volume, the data storage system passes level by level through the storage structures until a pointer is available, and reads the data designated by the first available pointer. If the data block was not found in any of the snapshot volumes, then the system looks in the base virtual volume.

In another embodiment, a snapshot read operation is performed by first accessing the data structures of the most recent snapshot volume before the data structures of the base virtual volume so that the latest written data is accessed. In a read of the snapshot volumes, the system searches the various Level 1, 2, and so on tables, and if a pointer entry is found in the snapshot volume, the entry is returned as the result of the read operation. A pointer in the final level table (e.g., Level 3 tables 670a, 670b, or 670c) points to a block in physical storage. If no pointer entry is found in the snapshot volumes, the system returns to the base virtual volume.

In some embodiments, pointers may be set to skip over one or more snapshot volumes of the snapshot tree. For example, if a desired data block is found in the fourth snapshot volume along a branch, then a pointer may be set in the first snapshot volume so that a subsequent search for the data block in the first snapshot volume will automatically skip to the fourth snapshot volume. This saves time and improves performance by avoiding the second and third snapshot volumes in subsequent searches for that data block.

In one embodiment, data and structures of the base and snapshot volumes of the snapshot tree 2000 may be exported or transferred between nodes 12 of the data storage system.

Additional details regarding the tree-like data structure and its advantages are provided in co-pending U.S. patent application Ser. No. 10/655,961, entitled "Read-Write Snapshots, ". Such application is assigned to the same Assignee as the present application and is hereby incorporated by reference in its entirety.

Snapshot Differences and Backup

Embodiments of the present invention provide or facilitate rapid synchronization of backup copies of a virtual volume. Referring again to FIG. 8, with the tree-like data structure (e.g., snapshot tree 2000), a differential backup operation can be readily performed. For example, assume that the latest snapshot volume available to some device for backup is snapshot volume 2212. If it is desirable to create a backup copy of a virtual volume as it existed at the time associated with snapshot volume 2204, the differences between snapshot volumes 2204 and 2212 can be determined so that a backup copy can be synchronized for snapshot volume 2204.

In one aspect, processes are provided for quickly and efficiently determining which pages are different between two snapshot volumes that descend from the same base volume (i.e., two snapshot volumes in the same snapshot tree (e.g., snapshot tree 2000)). This can be done by examining the exception tables for each snapshot volume being considered. The process iterates or is repeated through the pages of the two snapshot volumes, determining which pages are different between the two volumes. Once the differences have been determined, a backup copy of the volume can be generated or modified so that it reflects the state of memory of the volume at the time that the most recent snapshot was created.

Figure 9:
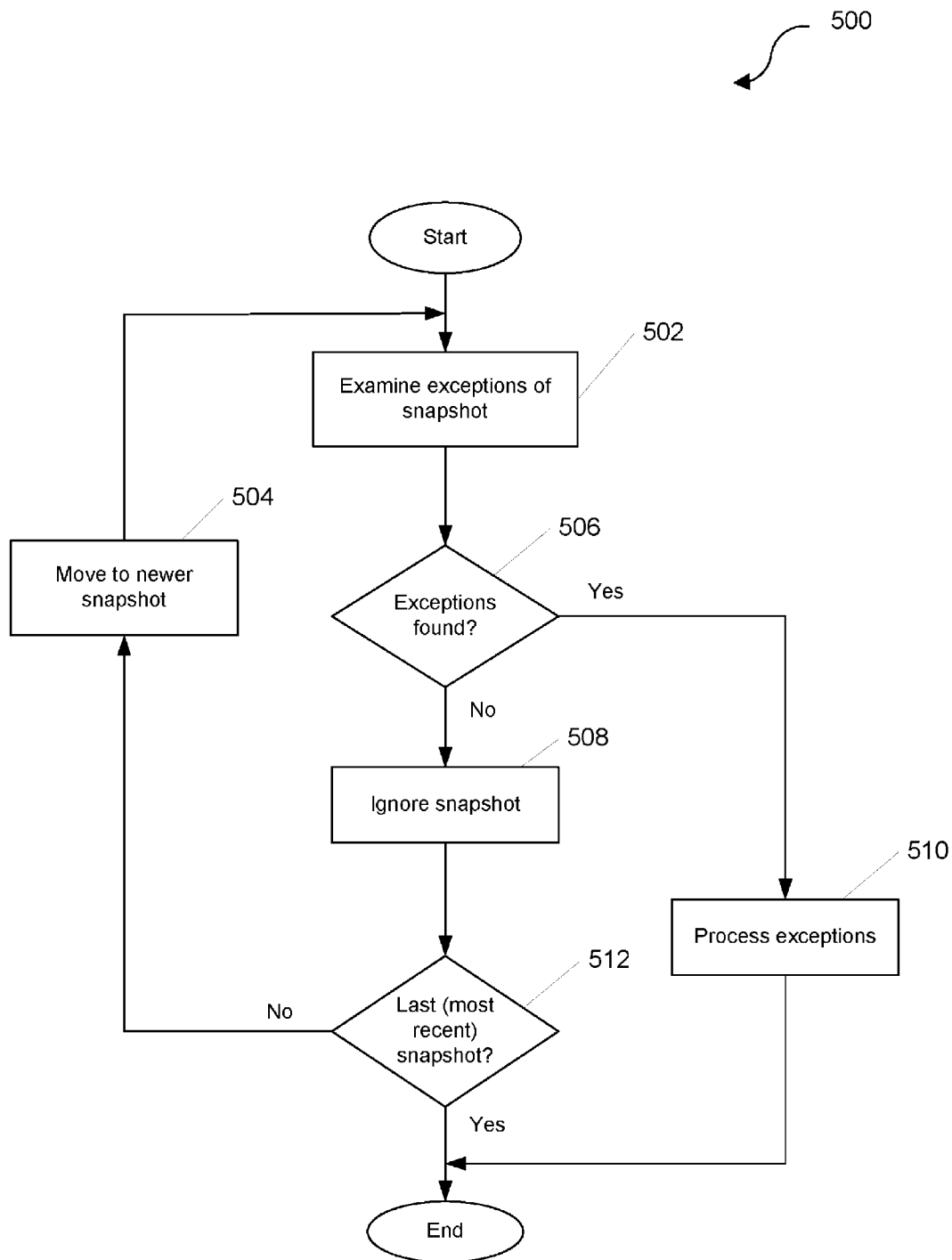
FIG. 9 is a flowchart of an exemplary method for determining differences between two snapshot volumes, where one of the snapshot volumes is ascended from the other in the snapshot tree.

FIG. 9 is a flowchart of an exemplary method 500 for determining differences between two snapshot volumes, where one of the snapshot volumes is directly ascended from the other in the snapshot tree (i.e., one snapshot volume is "up the tree" from the other snapshot volume). This would be the case for: (1) two snapshot volumes on the same branch of the snapshot tree; or (2) two snapshot volumes on different branches, where one branch is an offshoot of the other (main) branch and the snapshot volume on the main branch appears on that branch at a point prior to the offshoot.

An illustrative example of two snapshot volumes on the same branch of the snapshot tree would be snapshot volumes 2206 and 2204 in FIG. 8. These snapshot volumes 2206 and 2204 are both on the branch made up of base volume 2200 and snapshot volumes 2206, 2212, 2210, and 2204). As depicted, there are two intervening snapshot volumes (i.e., snapshots 2210 and 2212) between snapshot volumes 2204 and 2206, but it should be understood that there may be any number of intervening, previous or subsequent snapshot volumes with respect to the two snapshot volumes 2204, 2206 being examined. Snapshot volume 2206 is an older snapshot volume, while the snapshot volume 2204 is more recent.

An illustrative example of two snapshot volumes on different branches, where one branch is an offshoot of the other (main) branch and the snapshot volume on the main branch appears on that branch at a point prior to the offshoot, would be snapshot volumes 2308 and 2204. Snapshot volume 2204 is on the branch comprising snapshot volumes 2206, 2212, 2210, and 2204, while snapshot volume 2308 is on the branch comprising snapshot volumes 2310, 2308, and 2304. Snapshot volume 2204 appears at a point in the first branch of snapshot tree at or before it divides into the second branch.

The remainder of the description for method 500 will be provided in the context of the first illustrative example from above (i.e., in which the two snapshot volumes 2206 and 2204 under consideration are on the same branch of the snapshot tree), but it should be understood that method 500 is applicable for the second illustrative example as well.

In one embodiment, method 500 can be performed by hardware/software at a node 12, including one or more executable processes. Method 500 can be performed for each page or block of storage locations in a virtual volume. Method 500 begins at step 502 where the exceptions, if any, of the snapshot 2206 are examined. This can be done, for example, by examining the exception tables for the snapshot volume 2206. Exceptions are identified by entries in the various level mapping tables (e.g., Level 1, Level 2, and Level 3 tables), which may be considered exception tables. An entry in a level mapping table only exists if data has been changed or written (which is considered an exception) in a respective storage area of the virtual volume. In one embodiment, the software/hardware at a node (owning or replicant) accesses the exception tables for the snapshot volume. More specifically, the node 12 may access the nodes that control the Level 1, Level 2, Level 3 tables to determine the exceptions (changed data) of the snapshot.

At step 506 the node 12 determines if any exceptions can be found for the present snapshot volume (e.g., snapshot volume 2206). If exceptions are found, then changes were made to a particular page or pages of the base virtual volume 2200 since the time that the snapshot corresponding to volume 2206 was created and the time that the snapshot corresponding to volume 2212 was created. At step 510 the node 12 processes the exceptions, for example, as part of a routine for synchronization of a backup volume, after which method 500 ends. Else, if no exceptions are found at step 506 for the snapshot volume 2212, then no changes were made to the particular page or pages of the base volume 2200 at the time of the snapshot. This snapshot volume can be ignored at step 508 (no further processing is needed for that snapshot).

At step 512 the node 12 determines if the present snapshot is the last (or most recent) snapshot. If not, then at step 504 the node 12 moves up the snapshot branch to a newer snapshot volume (e.g., snapshot volume 2212), after which method 500 returns to step 502 when the exceptions of that snapshot volume are examined. Steps 504 through 512 are repeated until at step 512 the node 12 determines that the present snapshot volume is the most recent snapshot volume. Method 500 then ends.

Thus, with method 500, if there are any snapshot volumes (including the two snapshot volumes under consideration) that do not have any exceptions, such snapshot volumes are ignored. As such, differences between two snapshot volumes can be readily and quickly identified. In turn, backup copies of the virtual volume made using the different snapshot volumes can be rapidly and more efficiently synchronized. This differs from previously developed techniques for determining which blocks of data on a virtual volume have changed over time. These previously developed techniques involved maintaining a "change log" or a "dirty block list" for the virtual volume, thus requiring maintaining extra structures in addition to the structures needed to maintain a snapshot.

Figure 10:
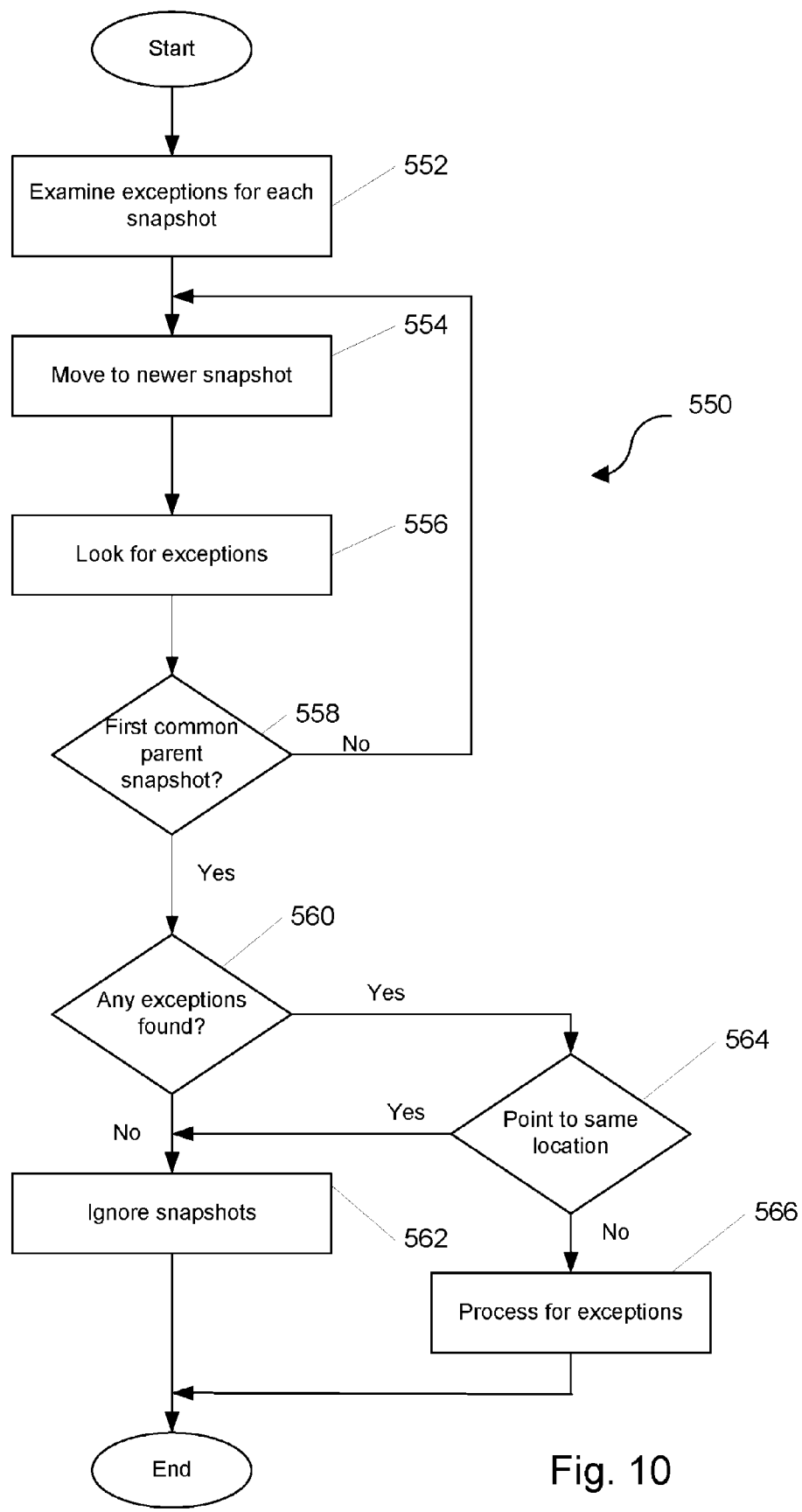
FIG. 10 is a flowchart of an exemplary method for determining differences between two snapshot volumes which are not ascended.

FIG. 10 is a flowchart of an exemplary method 550 for determining differences between two snapshot volumes which are not directly ascended (i.e., neither snapshot volume is "up the tree" from the other snapshot volume). This would be the case for two snapshot volumes on different branches, where one branch is an offshoot of the other branch and the two snapshot volumes appear on their respective branches at a point after the offshoot.

An illustrative example of two such snapshot volumes would be snapshot volumes 2206 and 2308 in FIG. 8, which are on different branches. Snapshot volume 2206 is on the branch comprising snapshot volumes 2206, 2212, 2210, and 2204, while snapshot volume 2308 is on the branch comprising snapshot volumes 2310, 2308, and 2304. Snapshot volume 2206 appears at a point in the first branch of snapshot tree after it divides into the second branch. Thus, neither snapshot 2206 or 2308 is "up the tree" from the other snapshot.

In one embodiment, method 550 can be performed by hardware/software at a node 12, including one or more executable processes. Method 550 can be performed for each page or block of storage locations in a virtual volume. Method 550 begins at step 552 where the node 12 examines exceptions, if any, for the two snapshot volumes 2206 and 2308. This can be done, for example, by accessing the various level mapping tables for the respective snapshots. Then, for each snapshot volume 2206 or 2308 being considered, node 12 moves to a newer snapshot volume at step 554. At step 556, the node 12 looks for exceptions in the newer snapshot.

At step 558, node 12 determines if the first common parent snapshot volume (i.e., snapshot volume 2204 in this illustrative example) has been reached. If not, method 550 returns to step 554 where node 12 moves to a newer snapshot in the respective branch. Steps 554 through 558 are repeated for each of the first and second branches until the common parent snapshot is reached. Thus, in the illustrative example, the intervening snapshot volumes 2212 and 2210 of the first branch and intervening snapshot volume 2304 of the second branch are examined for exceptions up to the common parent snapshot volume 2204.

At step 560 the node 12 determines if any exception were found in any of the snapshot volumes 2308, 2304, 2204, 2206, 2212, and 2210. If no exceptions are found, then there is no difference between the snapshot volumes under consideration (e.g., snapshot volumes 2206 and 2308). Accordingly, the snapshot volumes are ignored at step 562, after which method 550 ends.

Otherwise, if there are exceptions in found in one or both branches, the node 12 compares the first exception that was found on the one branch with the first exception found on the other branch (if any), and determines at step 564 if the first exceptions in each branch point to the same location or area of data storage. If the first exceptions in each branch do point to the same area of data storage, there are no differences between the snapshot volumes 2308 and 2206 under consideration. Thus, method 550 moves to step 562 where the node 12 ignores the snapshot volumes, after which method 550 ends. Else, if at step 564 it is determined that the exceptions in the two branches do not point to the same location, then at step 566 the node 12 processes for these exceptions, after which method 550 ends.

Like method 500 described above, method 550 allows various snapshot volumes to be ignored. Accordingly, backup copies of the virtual volume made using the different snapshot volumes can be rapidly and more efficiently synchronized. Furthermore, the rate of change of a base volume can be readily determined, and differences in virtual volume over time may be analyzed.

Figure 11:
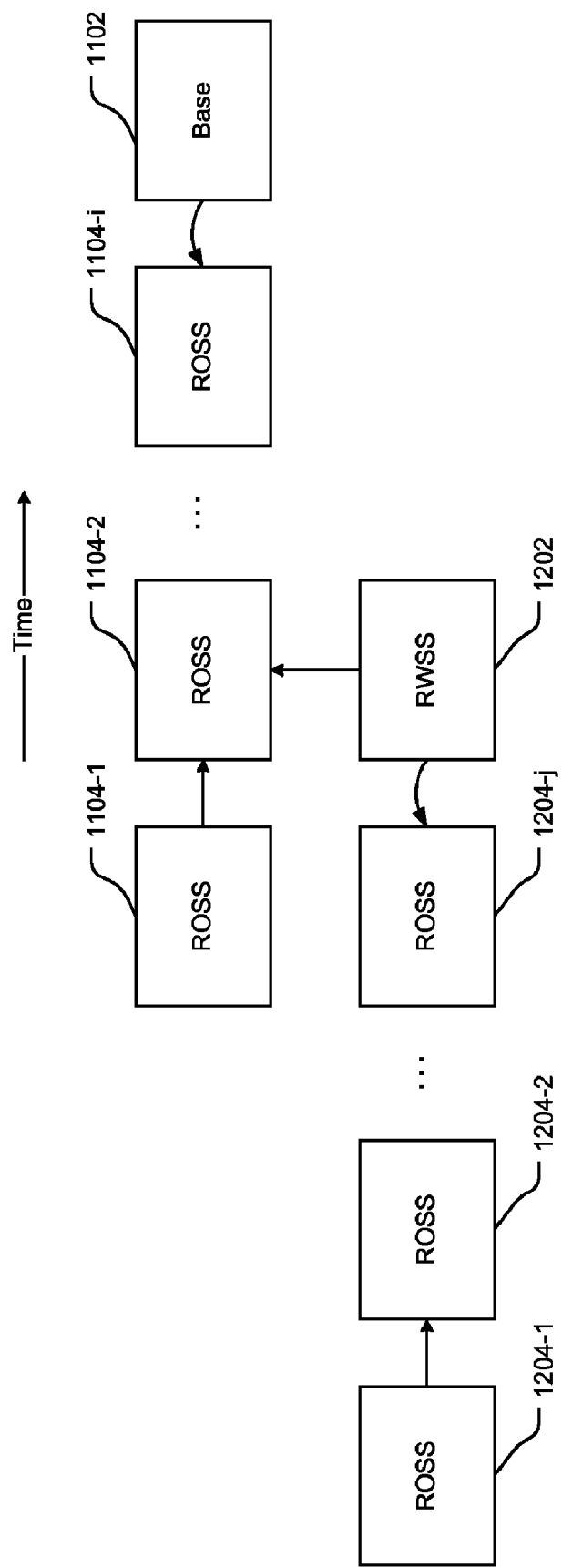
FIG. 11 illustrates a block diagram of a chain of snapshots including a read-write snapshot ("RWSS") descending from a read only snapshot ("ROSS") of a base volume in one embodiment of the invention.

FIG. 11 illustrates a chain of snapshots of a base volume 1102 in one embodiment. Base volume 1102 consists of blocks of data on a physical disk or a virtual disk made up of multiple physical disks. A storage management program creates snapshots of base volume 1102 periodically or under user commands. The storage management program is, e.g., software executed by a processor. Used herein, a "user" can be human or other software executed by a processor.

In one example, one embodiment of the storage management program creates a chain of snapshots 1104-1, 1104-2 . . . , and 1104-i that descend from base volume 1102. Snapshot 1104-1 is the first and the oldest snapshot created in time while snapshot 1104-i is the most recent and the last snapshot created in time.

In one example, snapshots 1104-1 to 1104-i are read only snapshots ("ROSS"). A ROSS presents a constant view of the data at a specific time to the user. While a particular ROSS is the most recent snapshot, the storage management program invokes copy-on-write ("COW") operations to copy data blocks from the base volume to the snapshot before those base data blocks are modified by write operations. Only the first write of a given base data block causes a COW operation. The storage management program allows subsequent writes of the base data block to go directly to the base volume. In summary, the first write to a data block in the base volume causes a COW to the most recent ROSS.

A user may desire to run a test program against the original data but does not desire to modify that data. Thus, one embodiment of the storage management program creates a read-write snapshot ("RWSS") that the user c write. The RWSS descends from a ROSS (e.g., a parent snapshot). For example, the storage management program creates RWSS 1202 that descends from ROSS 1104-2. A RWSS is a place to hold modifications to the parent ROSS. RWSSes can be read and written like a base volume. Thus, a RWSS can be written for testing purposes while the parent ROSS remains unchanged to preserve the original data.

In one example, one embodiment of the storage management program creates a chain of snapshots 1204-1, 1204-2 . . . , and 1204-j that descend from RWSS 1202 in response to user commands. The storage management program treats RWSS 1202 as a base volume, such as base volume 1102. In one embodiment of the invention, snapshots 1204-1 to 1204-j are ROSSes. The storage management program invokes a COW operation to copy a data block into the most recent ROSS before that data block is modified by a write operation to RWSS 1202. For each snapshot, only the first write of a given data block causes a COW push. Subsequent writes of the data block are allowed to go directly to RWSS 1202.

Figure 12:
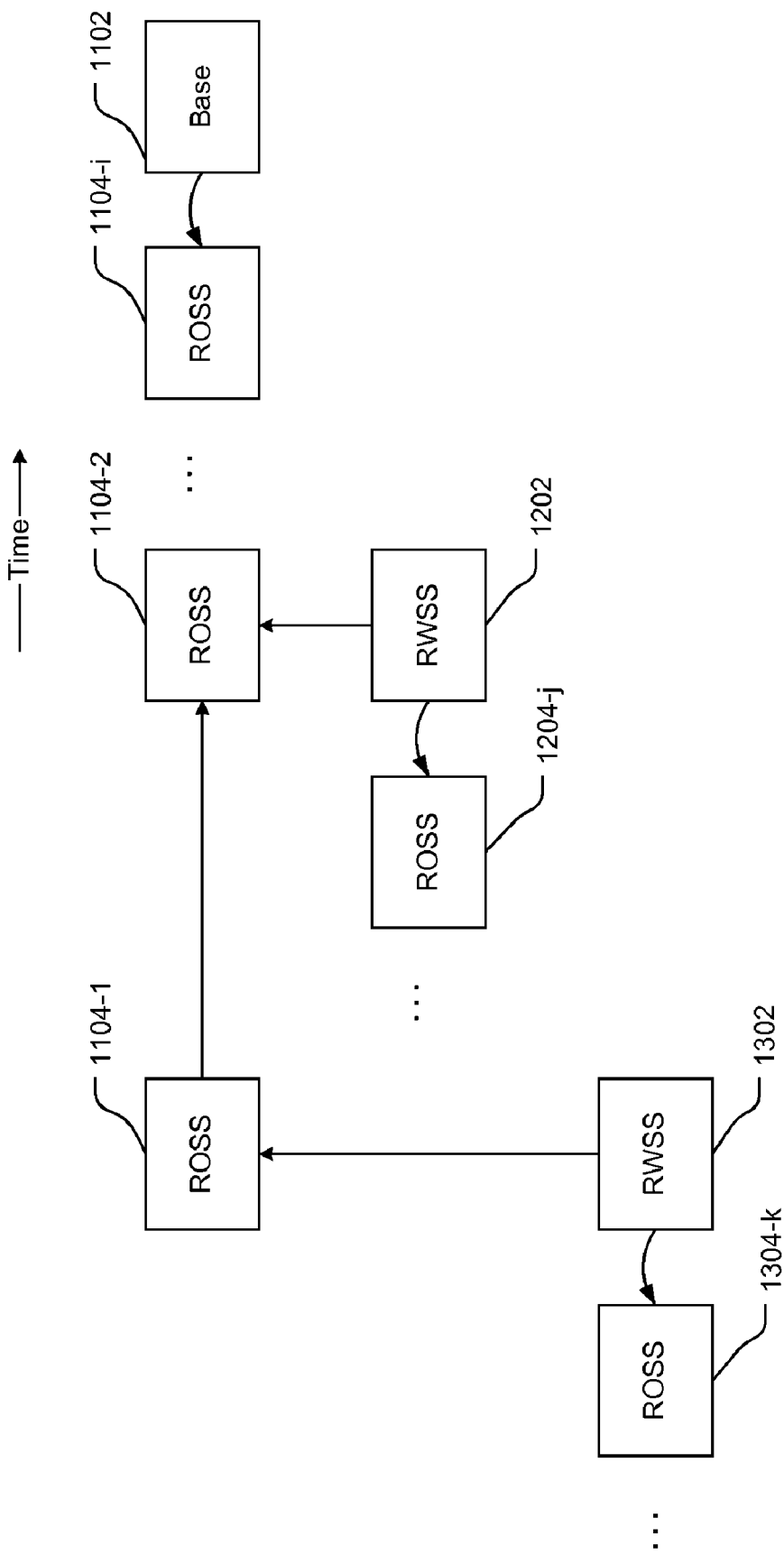
FIG. 12 illustrates a block diagram of a chain of snapshots including multiple RWSSes descending from ROSSes of a base volume in one embodiment.

FIG. 12 illustrates a chain of snapshots of a base volume 1102 in one embodiment. As can be seen, multiple RWSSes can be created for multiple ROSSes that descend from the same base volume. For example, the storage management program creates RWSS 1202 descending from ROSS 1104-2, and RWSS 1302 descending from ROSS 1104-1. Each of the RWSSes may have descending ROSSes, and each ROSS may have both descending RWSSes and ROSSes.

Figure 13:
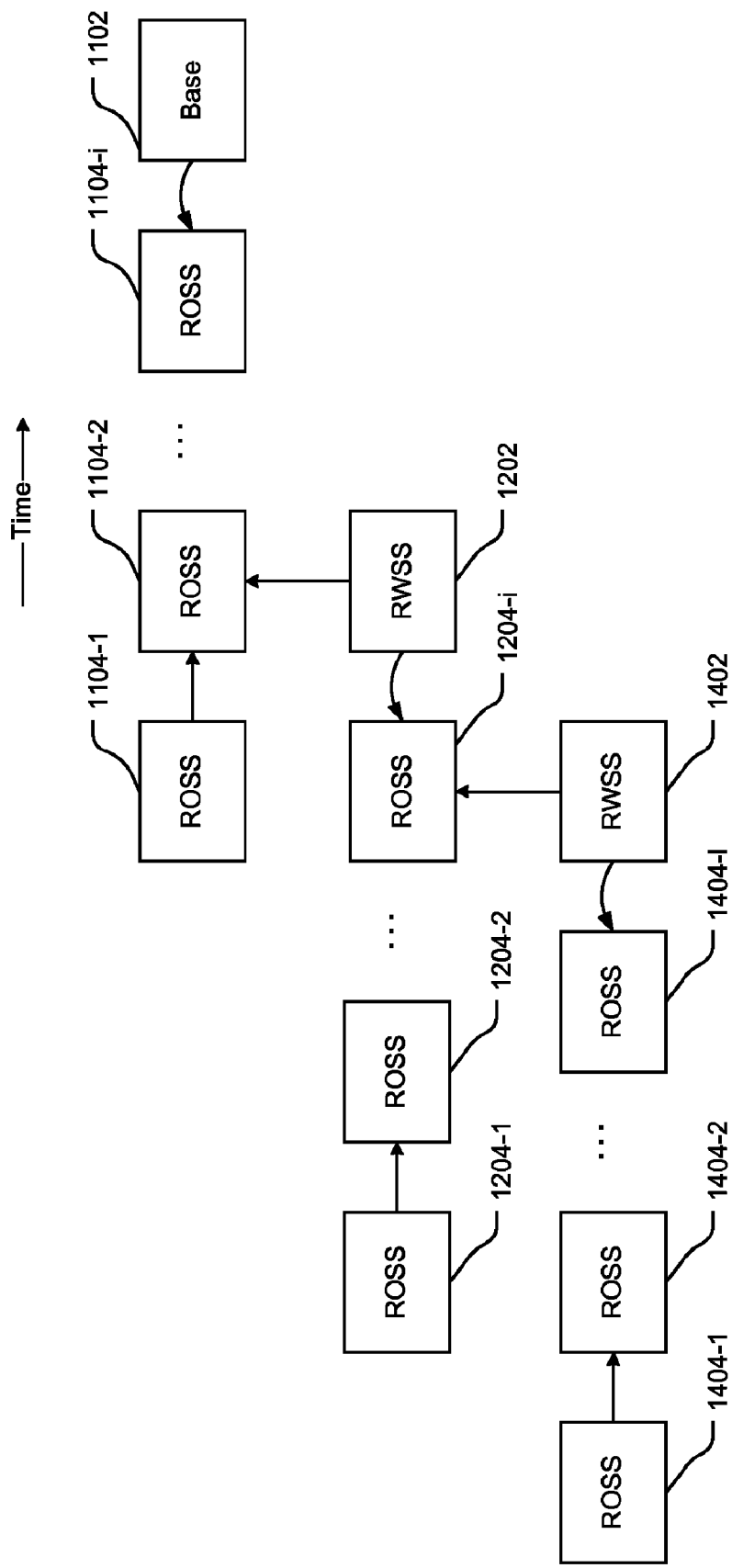
FIG. 13 illustrates a block diagram of a chain of snapshots including a RWSS descending from a ROSS of a RWSS in one embodiment.

FIG. 13 illustrates a chain of snapshots of base volume 1102 in one embodiment. As can be seen, a RWSS can descend from a ROSS of another RWSS. For example, the storage management program creates RWSS 1402 descending from ROSS 1204-i of RWSS 1202. Each of the RWSSes may have descending ROSSes, and each ROSS may have both descending RWSSes and ROSSes.

Figure 18:
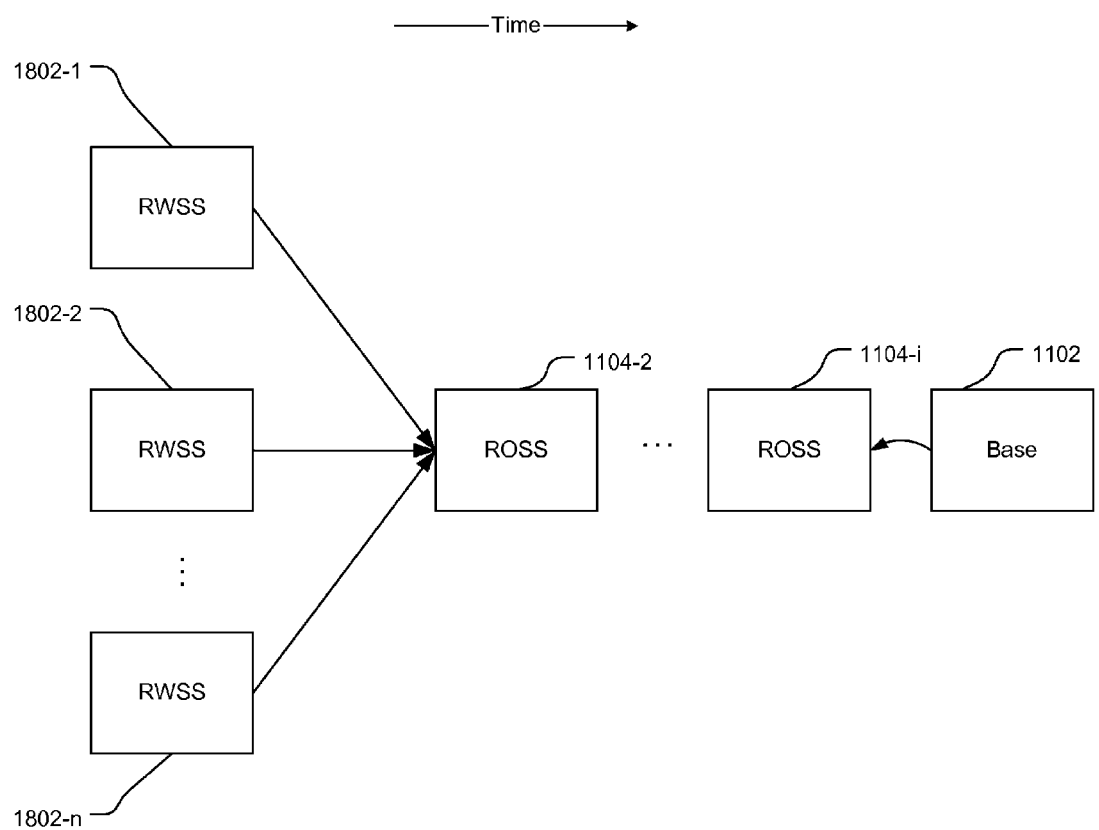
FIG. 18 illustrates a block diagram of a chain of snapshots including multiple RWSSes descending from the same ROSS in one embodiment.

FIG. 18 illustrates a chain of snapshots of base volume 1102 in one embodiment. As can be seen, multiple RWSSes can descend from the same ROSS. For example, the storage management program creates RWSS 1802-1, 1802-2 . . . , 1802-n descending from ROSS 1104-2. Each of the RWSSes may have descending ROSSes, and each ROSS may have both descending RWSSes and ROSSes. As shown in FIGS. 11 to 13 and 18, the embodiments of the storage management program will support arbitrary user requests for ROSS and RWSS creation.

Figure 14A:
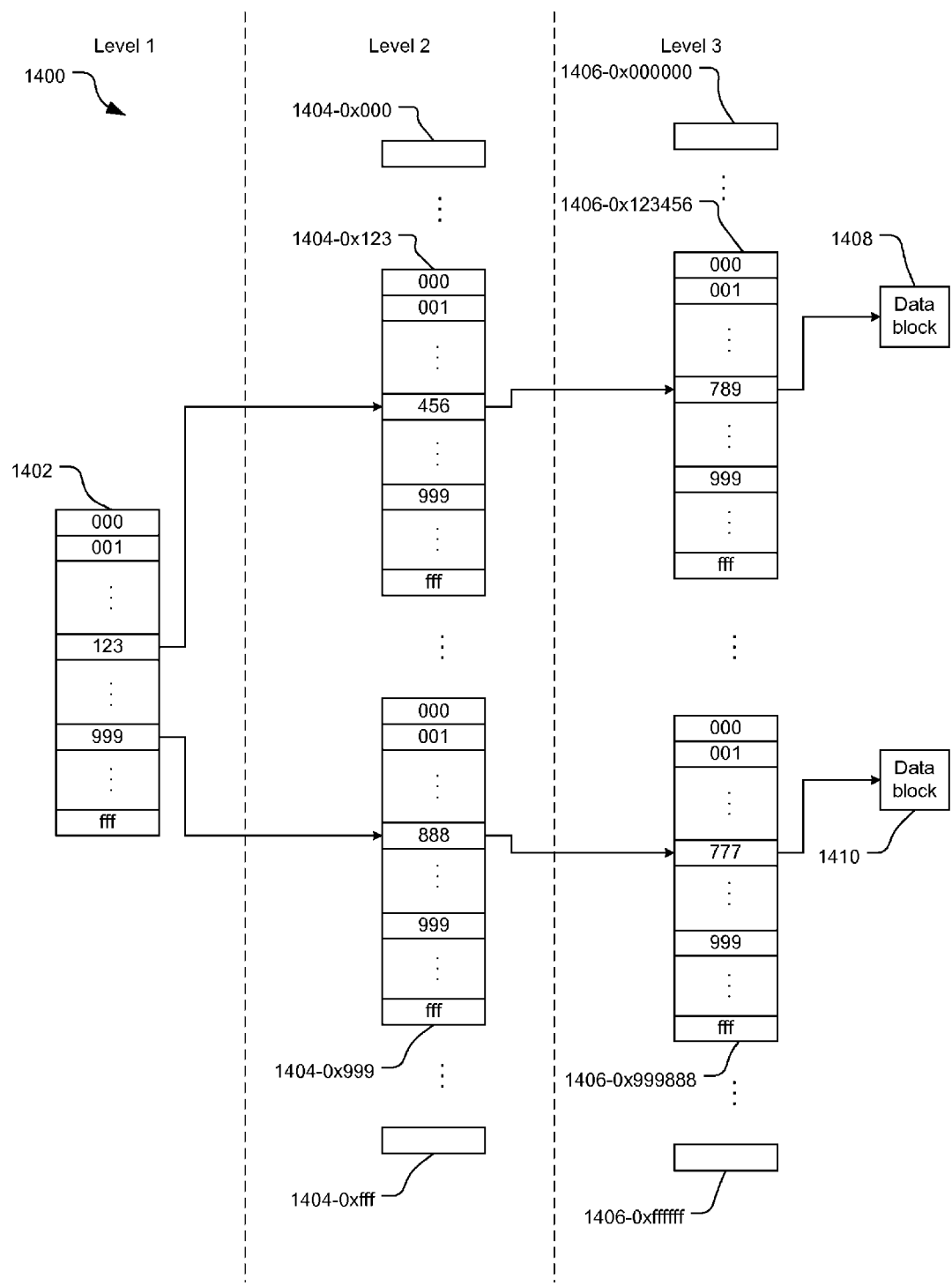
FIG. 14A illustrates a representation of the preserved copy-on-write data of a read only snapshot, or the user data of a read-write snapshot in one embodiment.

FIG. 14A illustrates a representation of a snapshot 1400 in one embodiment. Snapshot 1400 can be saved in memory and on disk. Snapshot 1400 can be a ROSS or a RWSS, where the only difference being that a ROSS can only be written before a more recent ROSS is created while a RWSS can be written anytime like a base volume. Snapshot 1400 includes data blocks and multiple address tables that infer the block addresses of the data blocks in the base volume ("block addresses"). If snapshot 1400 were a ROSS, it would contain data saved in COW operations to the base volume. If snapshot 1400 were a RWSS, it would contain data written by the user.

Figure 14B:
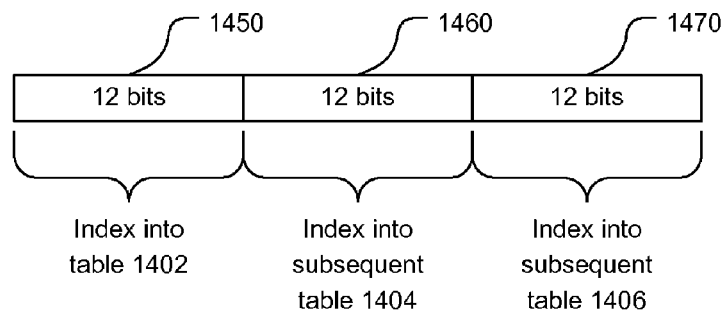
FIG. 14B illustrates a base block address divided into three parts in one embodiment.

Each of the block addresses is divided into parts. FIG. 14B illustrates one embodiment where the block address is divided into three parts 1450, 1460, and 1470. Subsequently the address tables are divided into three levels for indexing the block addresses to data blocks saved in snapshot 1400. A level 1 table (e.g., table 1402) consists of entries that can be indexed by the first part 1450 of the block addresses. Each of the level 2 tables (e.g., table 1404-0x000 to 1404-0xfff in one embodiment, where 0x indicates a hexadecimal address) consists of entries that can be indexed by the second part 1460 of the block addresses. Each of the level 3 tables (e.g., tables 1406-0x000000 to 1406-0xffffff in one embodiment) consists of entries that can be indexed by the third part 1470 of the block addresses. Each of the entries in the level 1 table may contain a pointer to one of the level 2 tables, and each of the entries in the level 2 tables may contain a pointer to one of the level 3 tables, and each of the entries in the level 3 tables may contain a pointer to one of the data blocks. The storage management program initially creates snapshot 1400 with only a blank level 1 table. As data blocks are saved to snapshot 1400 (described later), the storage management program adds the level 2 and level 3 tables that are necessary to manage those data blocks.

Figure 22:
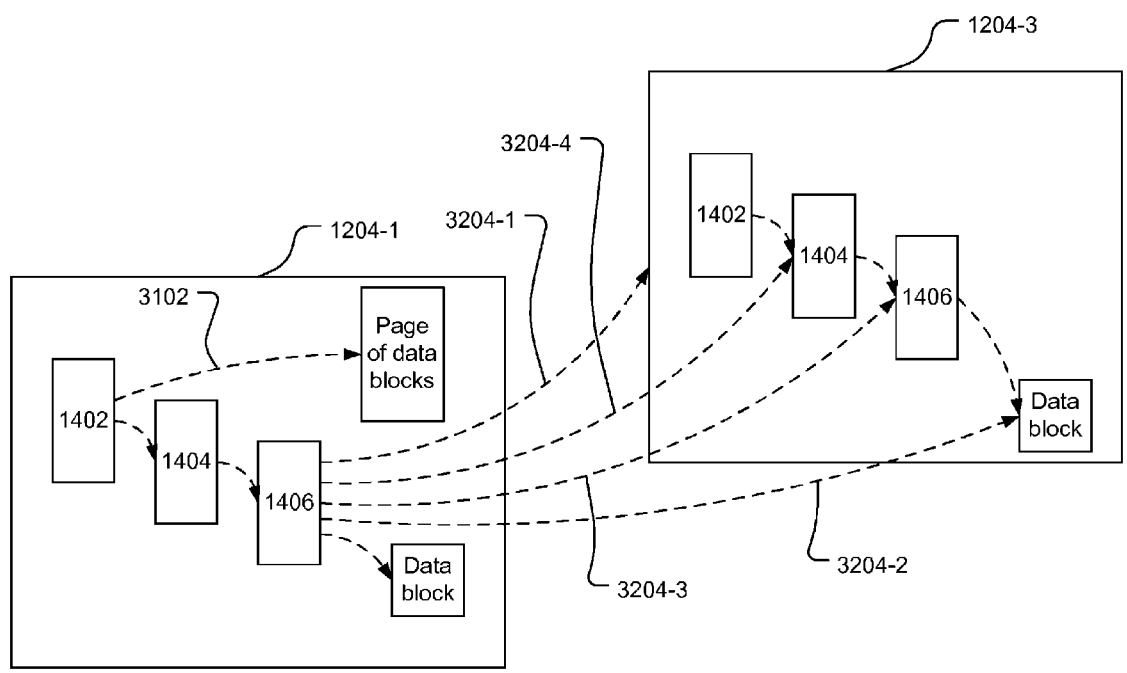
FIG. 22 illustrates various types of skip-pointers in a snapshot in one embodiment.

In one example, an entry in the level 1 table 1402 may contain a pointer to a page of contiguous data blocks instead of a pointer to a level 2 table. This is because these data blocks are contiguously written to the snapshot so their addresses take up an entire level 2 table and all the level 3 tables that branch from the level 2 table. In other words, these data blocks consist of all the data blocks in the snapshot that share the first part of their block addresses. To save space, the level 2 table and the level 3 tables are not created and a single entry in the level 1 table contains a pointer directly to these data blocks (e.g., a pointer in entry 0x123 leads to a page of data blocks having block addresses that range from 0x123000000 to 0x0123ffffff). In this example, this page would have a size of 1024×1024×block size. The block size can vary depending on the embodiment. FIG. 22 illustrates an example where an entry in level 1 table 1402 of ROSS 1204-1 contains a pointer 3102 to a page of contiguous data blocks.

In another example, an entry in the level 2 table 1404 may contain a pointer to a page of data blocks instead of a pointer to a level 3 table. This is because these data blocks are contiguously written so their addresses take up an entire level 3 table. In other words, these data blocks consist of all the data blocks in the snapshot that share both the first part and the second part of their block addresses. To save space, the level 3 table is not created and a single entry in the level 2 table may contain a pointer directly to a page of these data blocks (e.g., a pointer in entry 0x456 leads to a page of data blocks having addresses that range from 0x*456000 to 0x*456fff). In this example, this page would have a size of 1024×block size.

Figure 15:
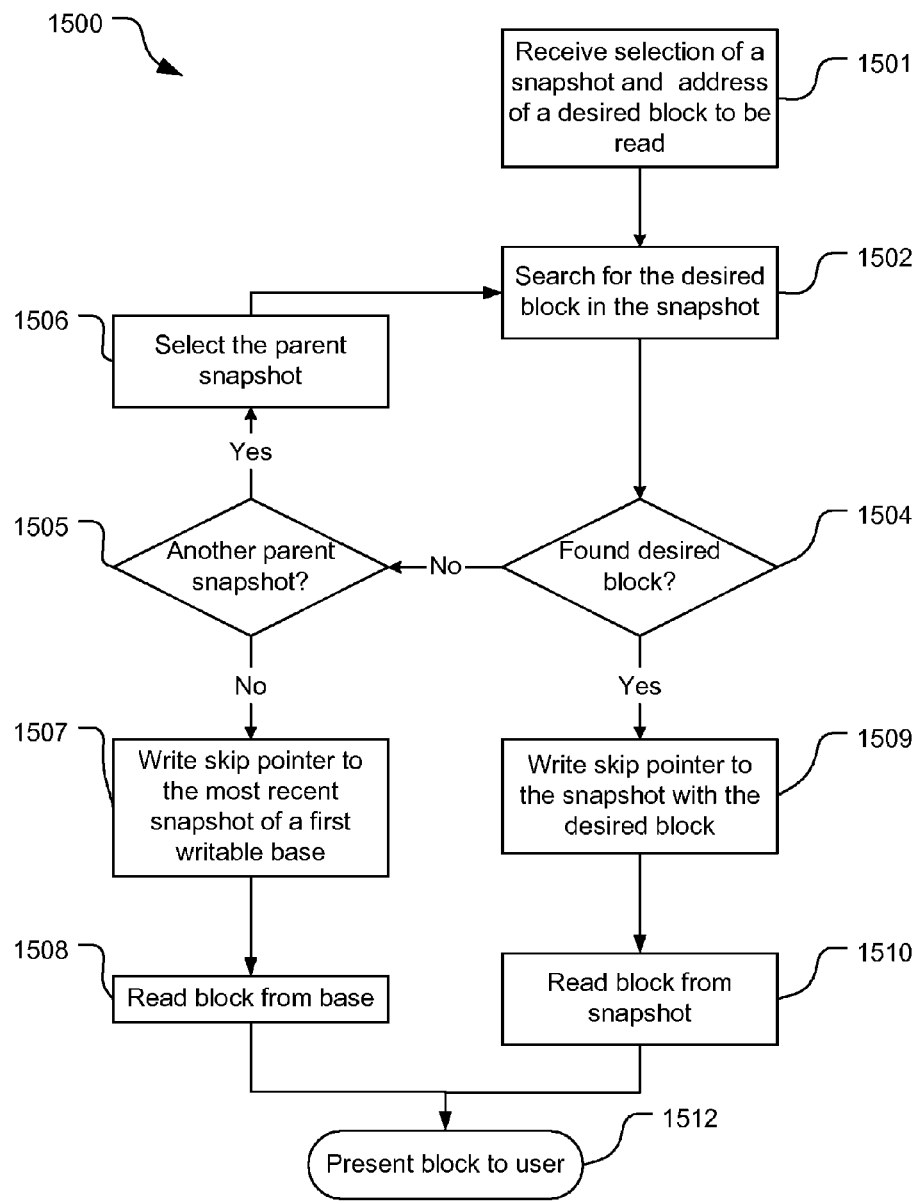
FIG. 15 illustrates a flowchart of a method to read a ROSS of a RWSS in one embodiment.

FIG. 15 illustrates one embodiment of a method 1500 for reading a data block from a snapshot descending from a RWSS at the request of a user in one example. In action 1501, the storage management program receives a read request for a desired data block in a selected snapshot (e.g., block 0x123456789 in a ROSS 1204-2 in FIG. 11).

In action 1502, the storage management program searches the snapshot for the data block in the following manner. The storage management program first uses the first part of the desired block address to index an entry in the level 1 table (e.g., looks at entry 0x123 in table 1402 associated with ROSS 1204-1). The entry may contain a pointer to a level 2 table. If the entry contains a valid pointer, the storage management program follows the pointer to the level 2 table and uses the second part of the desired block address to index an entry in the level 2 table (e.g., looks at entry 0x456 in table 1404-0x123 associated with ROSS 1204-1). The entry may contain a pointer to a level 3 table. If the entry contains a valid pointer, the storage management program follows the pointer to the level 3 table and uses the third part of the desired block address to index an entry in the level 3 table (e.g., looks at entry 0x789 in table 1406-0x123456 associated with ROSS 1204-1). The entry may contain a pointer to data block 1408 if data block 0x123456789 is stored in the selected snapshot.

In one embodiment, each entry in the address tables includes a type field. The type field indicates whether the pointer in the entry leads to (1) another address table in the current snapshot, (2) a data block in the current snapshot, (3) an address table of another snapshot, or (4) a data block in another snapshot. Of course, the type field can also indicate that the entry is null because there is no data at that particular address.

Type (1) pointer leads to another address table in the current snapshot and type (2) pointer leads to the data block in the current snapshot. As described above, an entry in the level 1 table may contain a pointer to another address table or directly to a page of contiguous data blocks in the current snapshot. Similarly, an entry in the level 2 table may contain a pointer to another address table or directly to a page of contiguous data blocks.

Type (3) pointer is one of the "skip-pointers" described later in actions 1507 and 1509. Type (3) pointer can be divided into three subtypes that lead indirectly to the data block. In a first subtype, the pointer in an address table representing a particular address leads to an address table representing the same address in a more recent snapshot. FIG. 22 illustrates one example where a skip-pointer 3204-3 in a table 1406 of ROSS 1204-1 leads to a corresponding table 1406 of ROSS 1204-3. In a second subtype, the pointer in a particular level of address table representing a particular address leads to an address table of a lower level that matches that particular address up to that lower level. FIG. 22 illustrates one example where a skip-pointer 3204-4 in a level 3 table 1406 of ROSS 1204-1 leads to a level 2 table 1404 of ROSS 1204-3 that matches the address up to level 2. In a third subtype, the pointer in an address table of a particular address leads to a more recent snapshot because the address table representing the same address has not been created in that more recent snapshot. FIG. 22 illustrates one example where a skip-pointer 3204-1 in table 1406 of ROSS 1204-1 leads only to ROSS 1204-3 if corresponding table 1406 of ROSS 1204-3 has not been created.

Type (4) pointer is also one of "skip-pointers" described later in actions 1507 and 1509. Type (4) pointer leads directly to the data block itself in a more recent snapshot. FIG. 22 illustrates one example where a skip-pointer 3204-2 in an entry in table 1406 of ROSS 1204-1 points to the data block in ROSS 1204-3.

In action 1504, the storage management program determines if the data block is stored in the snapshot. If so, action 1504 is followed by action 1509. If the data block is not stored in the snapshot, action 1504 is followed by action 1505.

In action 1505, the storage management program determines if the snapshot has a parent snapshot (i.e., if the selected snapshot descends from another snapshot). If so, action 1505 is followed by action 1506. If the snapshot does not have a parent snapshot, then action 1505 is followed by action 1507.

In action 1506, the storage management program selects the parent snapshot (i.e., the snapshot that is the next most recent in time). Action 1506 is followed by action 1502 where the storage management program searches for the data block with the same address in the parent snapshot.

Figure 20:
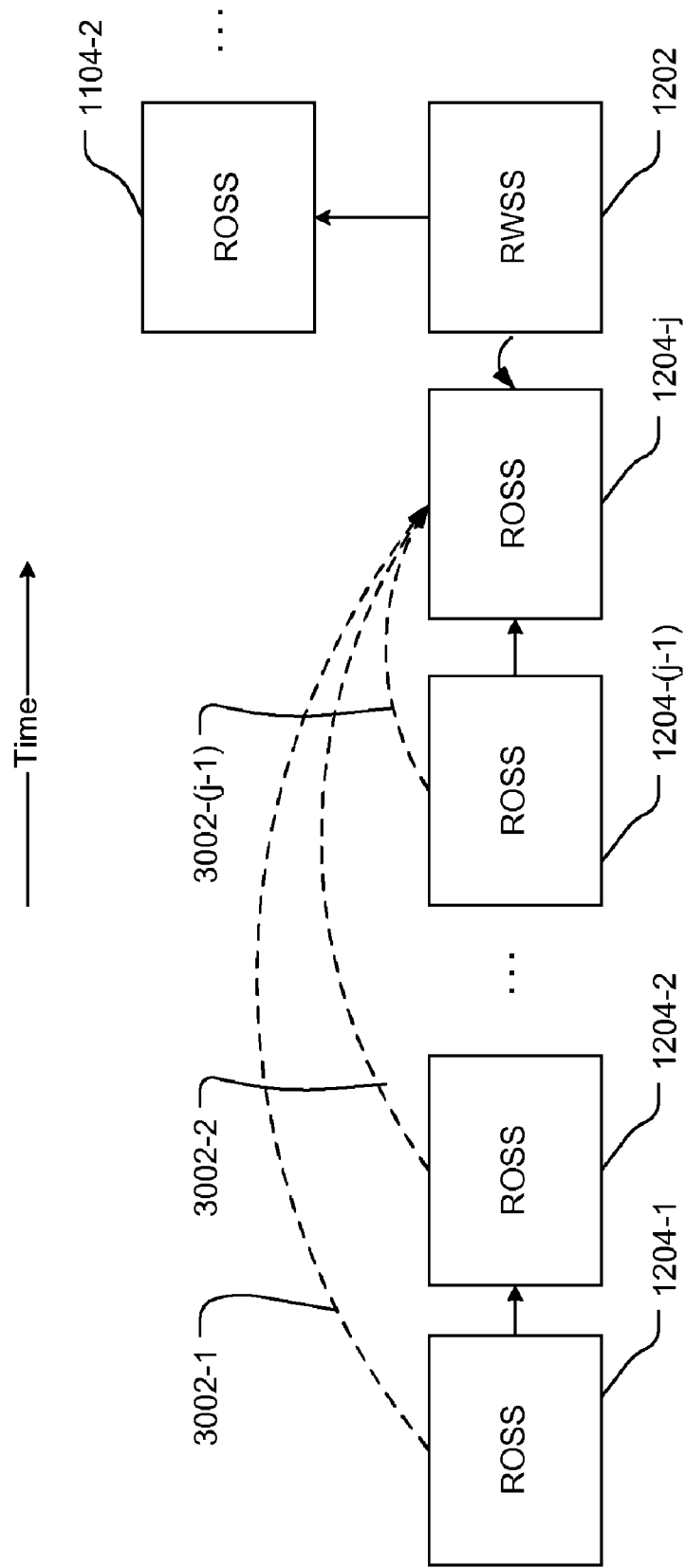
FIG. 20 illustrates a chain of snapshots with skip-pointers to the most recent snapshot in one embodiment.

In action 1507, the storage management program writes a skip-pointer in the null entries of the address tables in all of the snapshots that were searched in previous cycles through actions 1502, 1504, 1505, and 1506 that correspond to the desired block address. These skip-pointers lead to the most recent snapshot descending from a first writable base (i.e., a RWSS or a base volume, whichever comes first) in the chain between the selected snapshot of action 1501 and the base volume. Thus, whenever the selected snapshot of action 1501 is read for the desired data block, the skip-pointer would lead the storage management program directly to the first snapshot that could contain the desired data block. FIG. 20 illustrates one example where ROSSes 1204-1 to 1204-(j−1) have skip-pointers 3002-1 to 3002-(j−1) to the most recent snapshot 1204-j of RWSS 1202 as the result of action 1507.

In action 1508, the storage management program reads the data block from the base volume. Action 1508 is followed by action 1512.

In action 1509, the storage management program writes a skip-pointer in the selected snapshot of action 1501. The skip-pointer leads to a more recent snapshot that contains the desired data block or the desired data block itself in the more recent snapshot. Thus, whenever the selected snapshot of action 1501 is subsequently read for the desired data block, the skip-pointer would lead the storage management program directly to the snapshot containing the desired data block or the desired data block itself.

Figure 21:
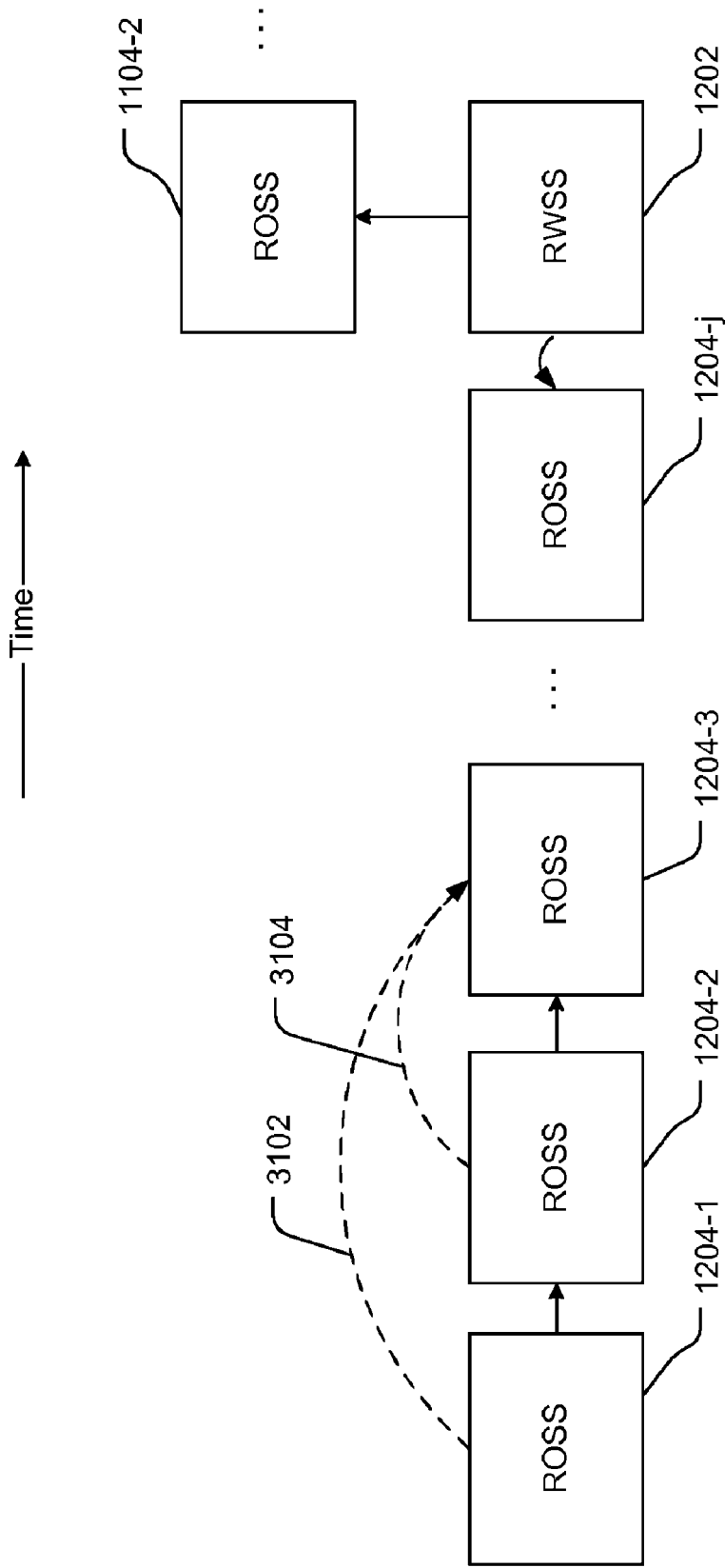
FIG. 21 illustrates a chain of snapshots with skip-pointers to a snapshot that contains the desired data block in one embodiment.

The storage management program may also write the skip-pointer in the null entries of the address tables that correspond to the desired block address in all of the snapshots that were searched in previous cycles of actions 1502, 1504, 1505, and 1506. In other words, the storage management program may also write the skip-pointer to the intermediate snapshots that are in the chain between the selected snapshot of action 1501 and the more recent snapshot containing the desired data block or the desired data block itself. This will speed up the search for the data block in a chain of snapshots. FIG. 21 illustrates one example where ROSSes 1204-1 and 1204-2 have respective skip-pointers 3102 and 3104 to ROSS 1204-3 that contains the desired data block as a result of action 1509.

In action 1510, the storage management program reads the data block from the selected snapshot. Action 1510 is followed by action 1512.

In action 1512, the storage management program returns the data block to the user and ends method 1500.

Figure 16:
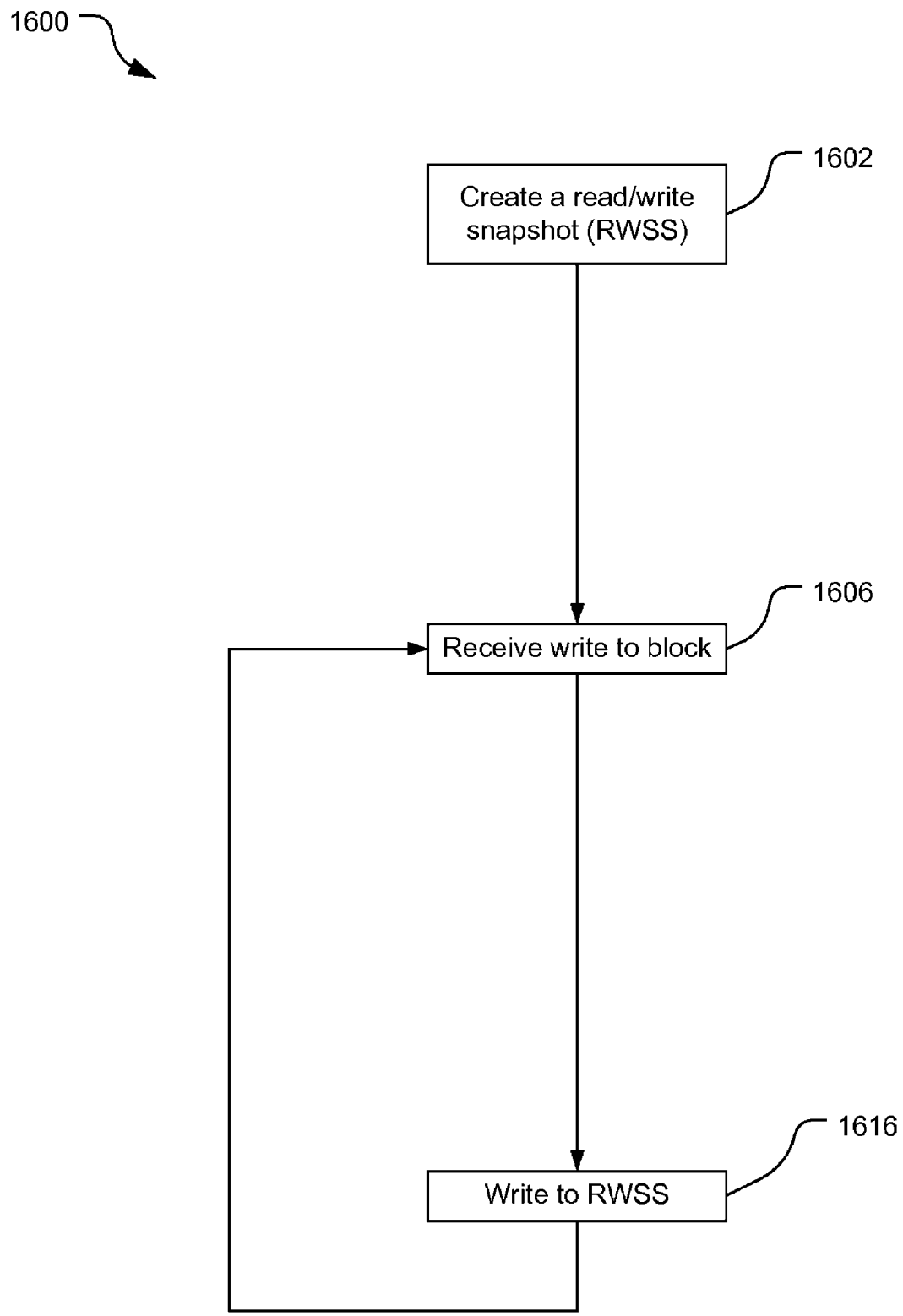
FIGS. 16 and 17 illustrate flowcharts of two methods to write to a RWSS in two embodiments.

FIG. 16 illustrates a method 1600 for writing to a RWSS in one embodiment. In action 1602, the storage management program creates a RWSS descending from a parent (e.g., RWSS 1202 descending from ROSS 1104-2 in FIG. 11).

In action 1606, the storage management program waits and then receives a base block address of a data block to be written in the RWSS from the user (e.g., address 0x999888777 of RWSS 1202 in FIG. 11).

In action 1616, the storage management program allows the write to the data block in the RWSS. The storage management program writes the data block to the ROSS in the following manner.

The storage management program first uses the first part of the block address of the data block to index an entry in the level 1 table (e.g., looks at entry 0x999 in table 1402 associated with ROSS 1204-j). The entry may contain a valid pointer to a level 2 table. If the entry contains a valid pointer, the storage management program follows the pointer to the level 2 table and uses the second part of the block address to index an entry in the level 2 table (e.g., looks at entry 0x888 in table 1404-0x999 associated with ROSS 1204-j). The entry may contain a pointer to a level 3 table. If the entry contains a valid pointer, the storage management program follows the pointer to the level 3 table and uses the third part of the block address to index an entry in the level 3 table (e.g., looks at entry 0x777 in table 1406-0x999888 associated with ROSS 1204-j). The storage management program then writes the data block (e.g., data block 1410) in the snapshot and writes a pointer to the data block in entry 0x777 in level 3 table 1406-0x999888.

As described above, the storage management program may need to add the level 2 table 1404 and the level 3 table 1406 if they were not previously created. After the storage management program adds the level 2 and level 3 tables, the storage management program writes the appropriate pointers in their entries. Furthermore, the storage management program may not need to create the level 2 table if the written data blocks are contiguous and take up an entire level 2 table and all the associated level 3 tables. Thus the entries in the level 1 table may contain pointers directly to a page of contiguous data blocks. Similarly, the storage management program may not need to create the level 3 table if the written data blocks are contiguous and take up an entire level 3 table. Thus the entries in the level 2 table may contain pointers directly to a page of contiguous data blocks.

Action 1616 is followed by action 1606 where the storage management program waits to receive another write to the RWSS.

Figure 17:
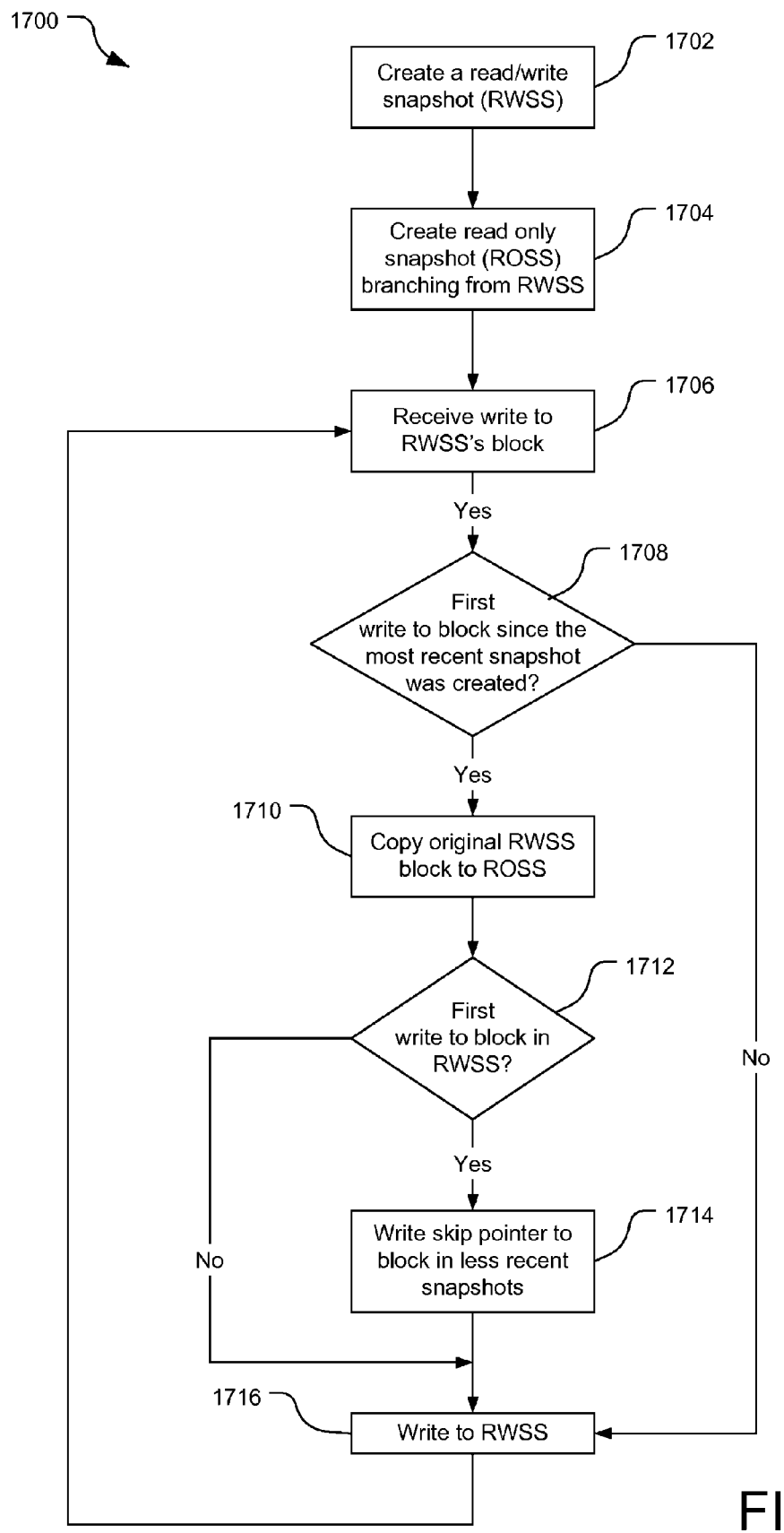

FIG. 17 illustrates a method 1700 for writing to a RWSS with a descending ROSS in one example. In action 1702, the storage management program creates a RWSS descending from a parent (e.g., RWSS 1202 descending from ROSS 1104-2 in FIG. 11).

In action 1704, the storage management program creates a ROSS that descends from the RWSS (e.g., ROSS 1204-j descending from RWSS 1202 in FIG. 11).

In action 1706, the storage management program waits and then receives the block address of a data block to be written in the RWSS from the user (e.g., address 0x999888777 of RWSS 1202 in FIG. 11).

In action 1708, the storage management program determines if this is the first write to that data block since the most recent snapshot was created in action 1704 by searching for the data block in the most recently created snapshot (e.g., by traversing the address tables associated with ROSS 1204-j). If the block cannot be found in the ROSS, then this is the first write to that block. Searching for the block in a snapshot is the same as described above for action 1502 but using the appropriate tables for ROSS 1204-*j*. If this is the first write to the data block, then action 1708 is followed by action 1710. Otherwise action 1708 is followed by action 1716.

In action 1710, the storage management program invokes a COW operation to copy the contents of the data block to the ROSS in the following manner. The storage management program first tries to read the data block from the RWSS. Reading the block in the RWSS is the same as described above for method 1500 but using the appropriate tables for RWSS 1202. For example, if the storage management program cannot find the data block in the RWSS, the storage management program needs to search for the data block in one or more parent snapshots or in the base volume.

Once the block has been read, then the storage management program writes the data block to the ROSS. The method to write to the ROSS is the same as the write to the RWSS described above in method 1600 but using the appropriate tables for ROSS 1204-*j*.

In action 1712, the storage management program determines if this will be the first write to a particular block in the RWSS. If not, action 1712 is followed by action 1716. If this will be the first write to a particular block in the RWSS, then action 1712 is followed by action 1714. The storage management program can determine if this is a first write by searching for this block in all the snapshots that descend from the RWSS. If this block cannot be found, then this is the first write to this block in the RWSS.

In action 1714, the storage management program writes a skip-pointer to the block in one or more of the less recent snapshots. The storage management program writes the skip-pointer in the null entries of the address tables in the less recent snapshots. Thus, when any of the less recent snapshots are read for the data block, the skip-pointer would lead the storage management program to the snapshot with the data block. FIG. 20 illustrates one example where ROSS 1204-1 to 1204-(*j*−1) have skip-pointers 3002-1 to 3002-(*j*−1) to the most recent snapshot 1204-*j* of RWSS 1202 that contains the data block.

In action 1716, the storage management program allows the write to the data block in the RWSS. The method to write to the RWSS is the same as the write to the RWSS described above in method 1600. Action 1716 is followed by action 1706 where the storage management program waits to receive another write to the RWSS.

Method 1700 (FIG. 17) can be used to write to a base volume in one embodiment. In such an embodiment, all "RWSS" are replaced with "base volume" in the actions of method 1700. Furthermore, no address tables are created in the base volume and data are simply written to the memory or disk space delineated as the base volume.

Figure 19:
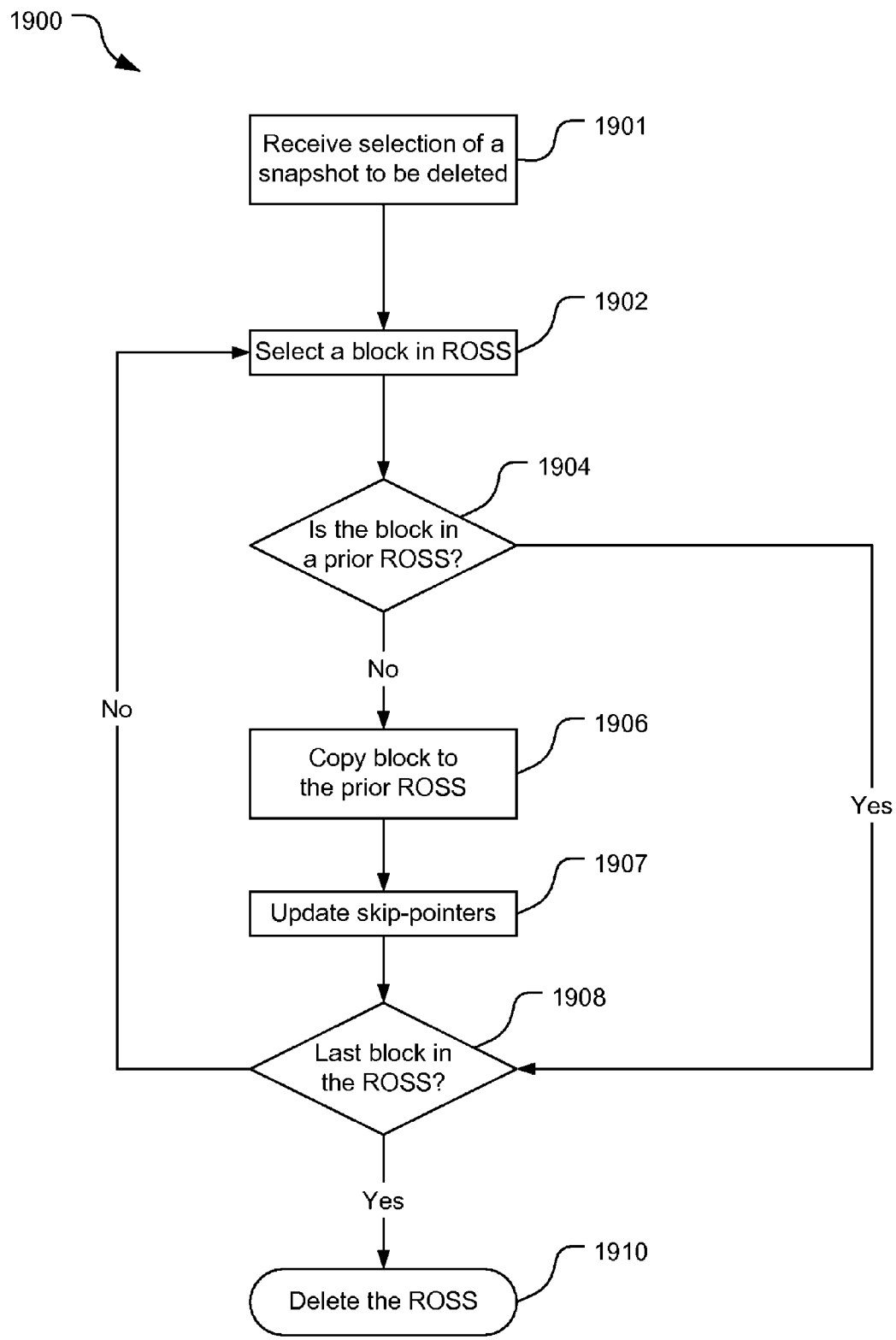
FIG. 19 illustrates a flowchart of a method to delete a snapshot from a chain of snapshots in one embodiment.

The storage management program may delete a snapshot to conserve memory or disk space under user command. To delete a snapshot, the storage management program merges the to-be-deleted snapshot with an adjacent older snapshot to preserve any original data stored in the to-be-deleted snapshot that the older snapshots depended on. FIG. 19 illustrates one embodiment of a method 1900 to delete a snapshot in a chain of snapshots. In one example, the user commands the storage management program to delete ROSS 1204-2 in FIG. 11.

In action 1901, the storage management program receives the user command to delete ROSS 1204-2. In action 1902, the storage management program selects a data block in ROSS 1204-2.

In action 1904, the storage management program determines if there is a data block in the adjacent older snapshot (e.g., ROSS 1204-1) with the same address as the selected data block in ROSS 1204-2. If so, action 1904 is followed by 1908. If there is not a data block in the adjacent older ROSS 204-1 with the same address as the selected data block in ROSS 1204-2, then action 1904 is followed by action 1906.

In action 1906, the storage management program copies the selected data block from ROSS 1204-2 to ROSS 1204-1. The method to write to ROSS 1204-1 is the same as the write to the RWSS described above in method 1600 but using the appropriate tables for ROSS 1204-1. Alternatively, to save a data copy operation, the storage management program can write a pointer in the address table entry of ROSS 1204-1 that corresponds to the address of the selected data block. This pointer leads to the selected data block in ROSS 1204-2. Action 1906 is followed by action 1907.

In action 1907, the storage management program searches backwards for skip-pointers in other older snapshots that point to the selected data block in the snapshot to be deleted. The storage management program then updates the skip-pointers to lead to the selected data block in its new snapshot location (e.g., ROSS 1204-1).

In action 1908, the storage management program determines if the selected data block from ROSS 1204-2 is the last block in ROSS 1204-2. If so, action 1908 is followed by action 1910. If the selected data block is not the last data block in ROSS 1204-2, action 1908 is followed by action 1902 and method 1900 cycles until the storage management program has examined each data block saved in ROSS 1204-2.

In action 1910, the storage management program deletes all content of ROSS 1204-2 but not the data blocks referenced by ROSS 1204-1 or any other older snapshots. Action 1910 ends method 1900.

Additional details regarding snapshots are provided in co-pending U.S. patent application Ser. No. 10/655,963, entitled "EFFICIENT AND RELIABLE VIRTUAL VOLUME MAPPING". This applications is assigned to the same Assignee as the present application and is hereby incorporated by reference in their entireties.

While the invention has been described with reference to various embodiments, it will be understood that these embodiments are illustrative and that the scope of the invention is not limited to them. For example, although many embodiments have been described primarily in the context of virtual memory, it should be understood that the embodiments are applicable to any form of memory (virtual or not). Variations, modifications, additions, and improvements of the embodiments disclosed herein may be made based on the description set forth herein, without departing from the scope and spirit of the invention as set forth in the following claims.

What is claimed is:

1. A non-transitory computer-readable storage medium encoded with an executable program for generating skip-pointers in a chain of snapshots descending from a parent, wherein the program causes a processor to perform the following:

receiving a write request to a data block in the parent;

determining if the write request is a first write request to the data block in the parent;

when the write request is the first write request to the data block in the parent:

copying the data block from the parent to a most recent snapshot in the chain of snapshots;

writing a skip-pointer in at least one of the other snapshots in the chain of snapshots, the skip-pointer leading to the data block in the most recent snapshot;

writing the data block in the parent;
when the write request is not the first write request to the data block, only writing the data block in the parent.

2. The non-transitory computer-readable storage medium of claim 1, wherein the parent is a base volume.

3. The non-transitory computer-readable storage medium of claim 1, wherein the parent is a read-write snapshot that can be written by a user.

4. The non-transitory computer-readable storage medium of claim 1, wherein the skip-pointer leads to an address table in the most recent snapshot and the address table at least partially represents an address of the data block.

5. The non-transitory computer-readable storage medium of claim 1, wherein the skip-pointer directly leads to the data block in the most recent snapshot.

6. The non-transitory computer-readable storage medium of claim 1, wherein the program further causes the processor to perform the following:
reading the data block from the at least one of the other snapshots, comprising:
searching for the data block in the at least one of the other snapshots;
finding the skip-pointer in the at least one of the other snapshots;
following the skip-pointer to the data block in the most recent snapshot; and
reading the data block from the most recent snapshot.

7. The non-transitory computer-readable storage medium of claim 1, wherein the skip-pointer leads to the most recent snapshot.

8. A non-transitory computer-readable storage medium encoded with an executable program for generating skip-pointers in a chain of snapshots, wherein the program causes a processor to perform the following:
searching for a data block in a selected snapshot in the chain of snapshots;
when the data block is not found in the selected snapshot, searching for the data block in more recent snapshots in the chain of snapshots;
when the data block is found in one of the more recent snapshots, writing a skip-pointer in the selected snapshot that leads to the data block in the one of the more recent snapshots, wherein one or more intermediate snapshots are between the selected snapshot and the one of the more recent snapshots; and
reading the data block from the one of the more recent snapshots.

9. The non-transitory computer-readable storage medium of claim 8, wherein the skip-pointer leads to the one of the more recent snapshots.

10. The non-transitory computer-readable storage medium of claim 8, wherein the skip-pointer leads to an address table in the one of the more recent snapshots and the address table at least partially represents an address of the data block.

11. The non-transitory computer-readable storage medium of claim 8, wherein the skip-pointer directly leads to the data block in the one of the more recent snapshots.

12. The non-transitory computer-readable storage medium of claim 8, wherein the program further causes the processor to perform the following:
searching again for the data block in the selected snapshot;
finding the skip-pointer in the selected snapshot;
following the skip-pointer to the data block in the one of the more recent snapshots; and
reading the data block from the one of the more recent snapshots.

13. The non-transitory computer-readable storage medium of claim 8, wherein the program further causes the processor to perform the following, when the data block is found in one of the more recent snapshots:
writing the skip-pointer in at least one of the one or more intermediate snapshots in the chain of snapshots between the selected snapshot and the one of the more recent snapshots.

14. The non-transitory computer-readable storage medium of claim 13, wherein the program further causes the processor to perform the following:
searching for the data block in the one of the one or more intermediate snapshots;
finding the skip-pointer in the one of the one or more intermediate snapshots;
following the skip-pointer to the data block in the one of the more recent snapshots; and
reading the data block from the one of the more recent snapshots.

15. The non-transitory computer-readable storage medium of claim 8, wherein the program further causes the processor to perform the following, when the data block is not found in any of the more recent snapshots:
writing the skip-pointer in the selected snapshot, the skip-pointer leading to a most recent snapshot in the chain of snapshots.

16. The non-transitory computer-readable storage medium of claim 15, wherein the program further causes the processor to perform the following:
searching again for the data block in the selected snapshot;
finding the skip-pointer in the selected snapshot;
following the skip-pointer to the data block in the most recent snapshot; and
searching for the data block in the most recent snapshot.

17. A method for generating skip-pointers in a chain of snapshots descending from a parent, comprising:
receiving a write request to a data block in the parent;
determining, using a programmed processor, if the write request is a first write request to the data block in the parent;
when the write request is the first write request to the data block in the parent:
copying, using the programmed processor, the data block from the parent to a most recent snapshot in the chain of snapshots;
writing, using the programmed processor, a skip-pointer in at least one of the other snapshots in the chain of snapshots, the skip-pointer leading to the data block in the most recent snapshot;
writing, using the programmed processor, the data block in the parent;
when the write request is not the first write request to the data block, only writing, using the programmed processor, the data block in the parent.

18. The method of claim 17, wherein the parent is a base volume.

19. The method of claim 17, wherein the parent is a read-write snapshot that can be written by a user.

20. The method of claim 17, wherein the skip-pointer leads to an address table in the most recent snapshot and the address table at least partially represents an address of the data block.

21. The method of claim 17, wherein the skip-pointer directly leads to the data block in the most recent snapshot.

22. The method of claim 17, further comprising:
reading the data block from the at least one of the other snapshots, comprising:

searching for the data block in the at least one of the other snapshots;

finding the skip-pointer in the at least one of the other snapshots;

following the skip-pointer to the data block in the most recent snapshot; and reading the data block from the most recent snapshot.

23. The method of claim 17, wherein the skip-pointer leads to the most recent snapshot.

24. A method for generating skip-pointers in a chain of snapshots, comprising:

searching, using a programmed processor, for a data block in a selected snapshot in the chain of snapshots;

when the data block is not found in the selected snapshot, searching, using the programmed processor, for the data block in more recent snapshots in the chain of snapshots;

when the data block is found in one of the more recent snapshots, writing, using the programmed processor, a skip-pointer in the selected snapshot that leads to the data block in the one of the more recent snapshots, wherein one or more intermediate snapshots are between the selected snapshot and the one of the more recent snapshots; and reading, using the programmed processor, the data block from the one of the more recent snapshots.

25. The method of claim 24, wherein the skip-pointer leads to the one of the more recent snapshots.

26. The method of claim 24, wherein the skip-pointer leads to an address table in the one of the more recent snapshots and the address table at least partially represents an address of the data block.

27. The method of claim 24, wherein the skip-pointer directly leads to the data block in the one of the more recent snapshots.

28. The method of claim 24, further comprising:

searching again for the data block in the selected snapshot;

finding the skip-pointer in the selected snapshot;

following the skip-pointer to the data block in the one of the more recent snapshots; and reading the data block from the one of the more recent snapshots.

29. The method of claim 24, further comprising, when the data block is found in one of the more recent snapshots:

writing the skip-pointer in at least one of the one or more intermediate snapshots in the chain of snapshots between the selected snapshot and the one of the more recent snapshots.

30. The method of claim 29, further comprising:

searching for the data block in the one of the one or more intermediate snapshots;

finding the skip-pointer in the one of the one or more intermediate snapshots;

following the skip-pointer to the data block in the one of the more recent snapshots; and reading the data block from the one of the more recent snapshots.

31. The method of claim 24, further comprising, when the data block is not found in any of the more recent snapshots:

writing the skip-pointer in the selected snapshot, the skip-pointer leading to a most recent snapshot in the chain of snapshots.

32. The method of claim 31, further comprising:

searching again for the data block in the selected snapshot;

finding the skip-pointer in the selected snapshot;

following the skip-pointer to the data block in the most recent snapshot; and searching for the data block in the most recent snapshot.

\* \* \* \* \*